United States Patent
Noguchi et al.

(10) Patent No.: US 9,557,842 B2
(45) Date of Patent: *Jan. 31, 2017

(54) DISPLAY DEVICE WITH TOUCH DETECTION FUNCTION

(71) Applicant: Japan Display Inc., Tokyo (JP)

(72) Inventors: Koji Noguchi, Kanagawa (JP);
Yoshitoshi Kida, Kanagawa (JP);
Kohei Azumi, Tokyo (JP); Takayuki Nakanishi, Kanagawa (JP); Hiroshi Mizuhashi, Kanagawa (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/684,571

(22) Filed: Apr. 13, 2015

(65) Prior Publication Data

US 2015/0212638 A1    Jul. 30, 2015

Related U.S. Application Data

(63) Continuation of application No. 13/211,441, filed on Aug. 17, 2011, now Pat. No. 9,030,420.

(30) Foreign Application Priority Data

Aug. 24, 2010    (JP) ................. 2010-187175

(51) Int. Cl.
*G06F 3/041* (2006.01)
*G06F 3/044* (2006.01)
*G02F 1/1333* (2006.01)

(52) U.S. Cl.
CPC ............. *G06F 3/0412* (2013.01); *G06F 3/044* (2013.01); *G02F 1/13338* (2013.01)

(58) Field of Classification Search
CPC ..... G06F 3/0412; G06F 3/044; G02F 1/13338
See application file for complete search history.

(56) References Cited

U.S. PATENT DOCUMENTS

| | | | |
|---|---|---|---|
| 2008/0042959 | A1 | 2/2008 | Ben-Shalom et al. |
| 2009/0135209 | A1 | 5/2009 | Takahashi |
| 2009/0244416 | A1 | 10/2009 | Liao et al. |
| 2010/0045632 | A1 | 2/2010 | Yilmaz et al. |

(Continued)

FOREIGN PATENT DOCUMENTS

| | | |
|---|---|---|
| CN | 101447176 A | 6/2009 |
| CN | 101681221 | 3/2010 |

(Continued)

OTHER PUBLICATIONS

Chinese Office Examination Report issued in connection with related Chinese Patent Application No. 201110236695X dated Sep. 11, 2014.

(Continued)

*Primary Examiner* — Ilana Spar
*Assistant Examiner* — Mihir K Rayan
(74) *Attorney, Agent, or Firm* — Dentons US LLP

(57) ABSTRACT

A display device including a display section having a plurality of pixel electrodes; and a plurality of drive electrodes extending in a first direction and arranged side-by-side in a second direction. Each of the drive electrodes has a width in the second direction corresponding to a size of the two or more pixel electrodes, and has one or more slits extending in the first direction.

15 Claims, 23 Drawing Sheets

(56) References Cited

U.S. PATENT DOCUMENTS

| | | |
|---|---|---|
| 2010/0182273 A1 | 7/2010 | Noguchi et al. |
| 2010/0265210 A1 | 10/2010 | Nakanishi et al. |
| 2010/0309162 A1 | 12/2010 | Nakanishi et al. |
| 2011/0095990 A1 | 4/2011 | Philipp et al. |
| 2011/0096016 A1 | 4/2011 | Yilmaz |
| 2012/0050237 A1 | 3/2012 | Noguchi et al. |
| 2012/0169665 A1 | 7/2012 | Misaki |

FOREIGN PATENT DOCUMENTS

| | | |
|---|---|---|
| JP | 2009-237519 | 10/2009 |
| JP | 2009-244958 | 10/2009 |
| JP | 2010-122951 | 6/2010 |
| TW | 201001010 A | 1/2010 |

OTHER PUBLICATIONS

Taiwanese Office Examination Report issued in connection with related Taiwanese Patent Application No. TW 100123939 mailed May 23, 2014.

Japanese Office Examination Report issued in connection with related Japanese Patent Application No. 2010-187175 dated Sep. 24, 2013.

SURFACE LUMINANCE: 300cd/m²

| SLIT PITCH (μm) | RECOGNITION OF STREAK | REMARKS |
|---|---|---|
| 1000 | × | CLEARLY RECOGNIZABLE |
| 900 | × | CLEARLY RECOGNIZABLE |
| 800 | × | CLEARLY RECOGNIZABLE |
| 700 | × | CLEARLY RECOGNIZABLE |
| 600 | × | CLEARLY RECOGNIZABLE |
| 500 | △ | RECOGNIZABLE AT 20cm OR LESS |
| 400 | △ | RECOGNIZABLE AT 20cm OR LESS |
| 300 | ○ | NOT RECOGNIZABLE |
| 200 | ○ | NOT RECOGNIZABLE |
| 100 | ○ | NOT RECOGNIZABLE |
| 50 | ○ | NOT RECOGNIZABLE |

FIG. 15

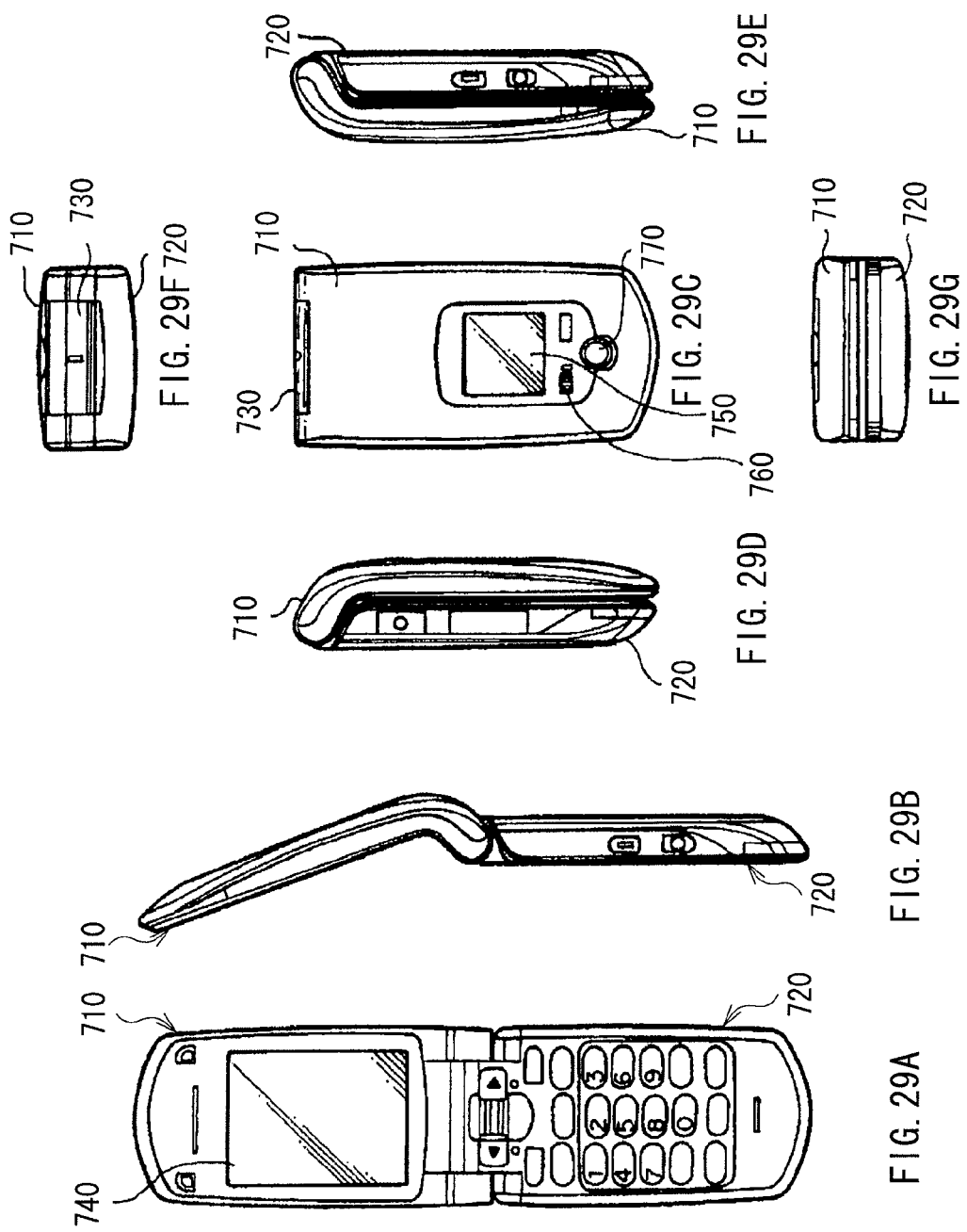

DISPLAY DEVICE WITH TOUCH DETECTION FUNCTION

RELATED APPLICATION DATA

This application is a continuation of U.S. patent application Ser. No. 13/211,441 filed Aug. 17, 2011, the entirety of which is incorporated herein by reference to the extent permitted by law. The present application claims the benefit of priority to Japanese Patent Application No. JP 2010-187175 filed on Aug. 24, 2010 in the Japan Patent Office, the entirety of which is incorporated by reference herein to the extent permitted by law.

BACKGROUND

This disclosure relates to a touch panel which enables a user to input information by bringing a user's finger etc. into contact therewith or bringing the same in proximity thereto. In particular, the disclosure relates to a display device with a touch detection function, of a type which detects the contact or the proximity based on a change in an electrostatic capacitance.

In recent years, attention has been drawn to a display device in which a contact detector, generally referred to as a touch panel, is mounted on a display such as a liquid crystal display, and which allows the display to display various button images etc. to thereby make it possible to input information instead of providing typical mechanical buttons. There are a number of types of touch panels, including such as an optical type and a resistance type. In devices such as a portable handheld terminal, in particular, there are high expectations for a touch panel of an electrostatic capacitance type. The electrostatic capacitance touch panel has a relatively simple configuration, and is capable of reducing power consumption.

Japanese Unexamined Patent Application Publication No. 2009-244958 (JP2009-244958A) discloses a display device with a touch detection function, in which the electrostatic capacitance touch panel is incorporated in the liquid crystal display device. The display device with the touch detection function disclosed therein is provided with a pixel electrode used for displaying an image, a touch detection electrode used for detecting a touch, and a drive electrode (a common electrode) shared by the pixel electrode and the touch detection electrode. JP2009-244958A discloses an embodiment where a plurality of drive electrodes, extending in a horizontal direction and divided in a perpendicular direction, are used (FIG. 5 of JP2009-244958A).

SUMMARY

The inventor/the inventors has/have found that when the number of division of electrodes is excessive in a configuration where a plurality of drive electrodes are used as discussed above, a magnitude and the number of wirings of a circuit used for the drive electrodes, especially the one which is disposed at a frame region outside an effective display region, within a substrate on which electrodes are formed are increased. In order to keep down the circuit magnitude and the number of wirings, it may be contemplated to drive a number of divided drive electrodes in a bundle or collectively. Also, in such case, it may be contemplated to form a width in a perpendicular direction of a single drive electrode to have a size corresponding to a plurality of pixels. However, a slit-like clearance is generated in a horizontal direction between the adjacent drive electrodes when the configuration is utilized which uses the plurality of drive electrodes. Thus, states of orientation of liquid crystal molecules are disturbed due to a structural difference between a portion where the slit-like clearance is formed and a portion where the drive electrode is formed. As a result, a portion corresponding to the slit-like clearance may be seen as a streak-like display defect.

It is desirable to provide a display device with a touch detection function, capable of keeping down a circuit magnitude and the number of wirings and suppressing deterioration in display quality while using a plurality of drive electrodes.

A display device with a touch detection function according to an embodiment of the technology includes: a plurality of drive electrodes extending in a first direction and arranged side-by-side in a second direction with an inter-electrode slit in between, each of the drive electrodes being supplied with a drive signal; a display section having a plurality of pixel electrodes arranged in matrix in the first and second directions to face the drive electrodes, application of the drive signal to each of the drive electrodes and application of an image signal to each of the pixel electrodes allowing image display; and a touch detection electrode allowing an electrostatic capacitance to be formed between the touch detection electrode and the drive electrodes, to output a detection signal in response to the drive signal applied to the drive electrodes. Each of the drive electrodes has a width in the second direction corresponding to a size of the two or more pixel electrodes, and has one or more inner-electrode slits extending in the first direction.

A display device according to another embodiment of the technology includes: a display section having a plurality of pixel electrodes; and a plurality of drive electrodes extending in a first direction and arranged side-by-side in a second direction. Each of the drive electrodes has a width in the second direction corresponding to a size of the two or more pixel electrodes, and has one or more slits extending in the first direction.

As used herein, the term "touch" refers not only to a contact of an object such as a finger of a user and a member including a pen, but also to an indirect contact or "proximity" of such an object.

In the display device with the touch detection function and the display device according to the embodiments of the technology, each of the drive electrodes has the width corresponding to the size of the two or more pixel electrodes. Thus, a circuit magnitude and the number of wirings used for the drive electrodes are kept down. Also, each of the drive electrodes has the one or more inner-electrode slits, and the inter-electrode slit corresponding to the inner-electrode slit is provided between the adjacent drive electrodes. Thus, a structural difference between a portion where the drive electrode is formed and a portion between the adjacent drive electrodes is reduced.

According to the display device with the touch detection function and the display device of the embodiments of the technology, each of the drive electrodes has the one or more inner-electrode slits, and the inter-electrode slit corresponding to the inner-electrode slit is provided between the adjacent drive electrodes. This makes it possible to reduce a structural difference between a portion where the drive electrode is formed and a portion between the adjacent drive electrodes. Hence, it is possible to uniformize states of orientation of liquid crystal molecules throughout the entire display region in an embodiment where any one of the display device with the touch detection function and the display device is applied to a liquid crystal device. Also, each of the drive electrodes has the width corresponding to the size of the two or more pixel electrodes, making it possible to keep down a circuit magnitude and the number of wirings used for the drive electrodes. Therefore, it is possible to keep down the circuit magnitude and the number of wirings and to suppress deterioration in display quality while using the plurality of drive electrodes.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

Figure 5:
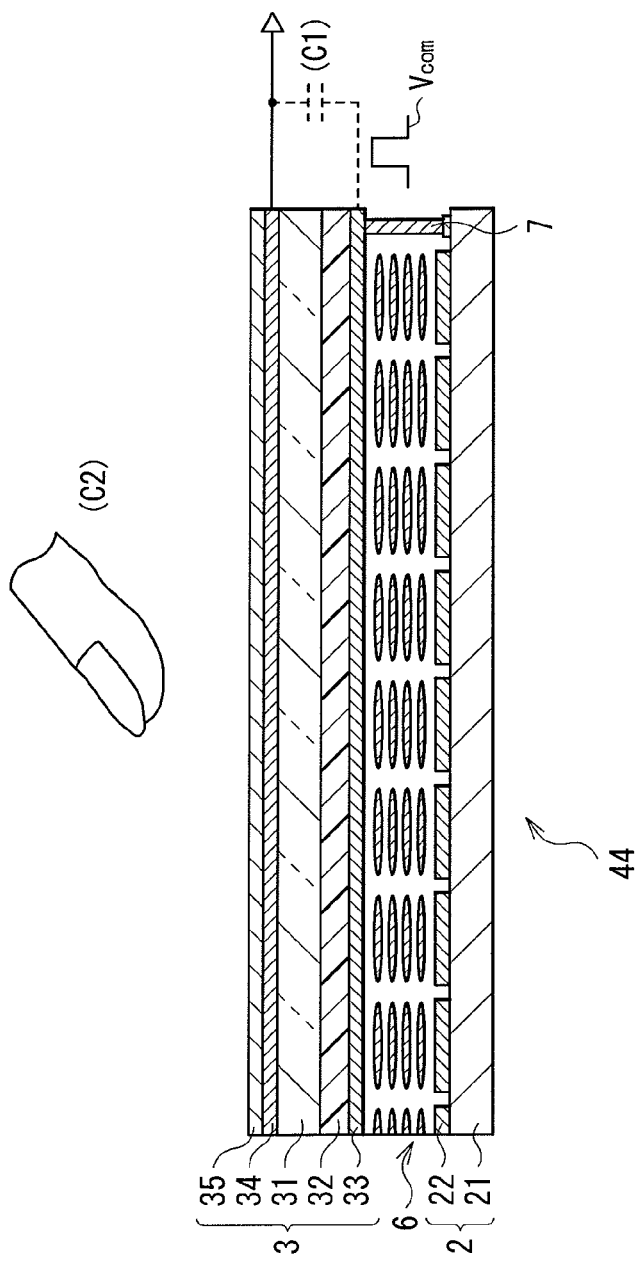
FIG. 5 is a cross-sectional view illustrating a schematic cross-sectional configuration of a touch detection function display unit in the display device with the touch detection function illustrated in FIG. 4.
Figure 10:
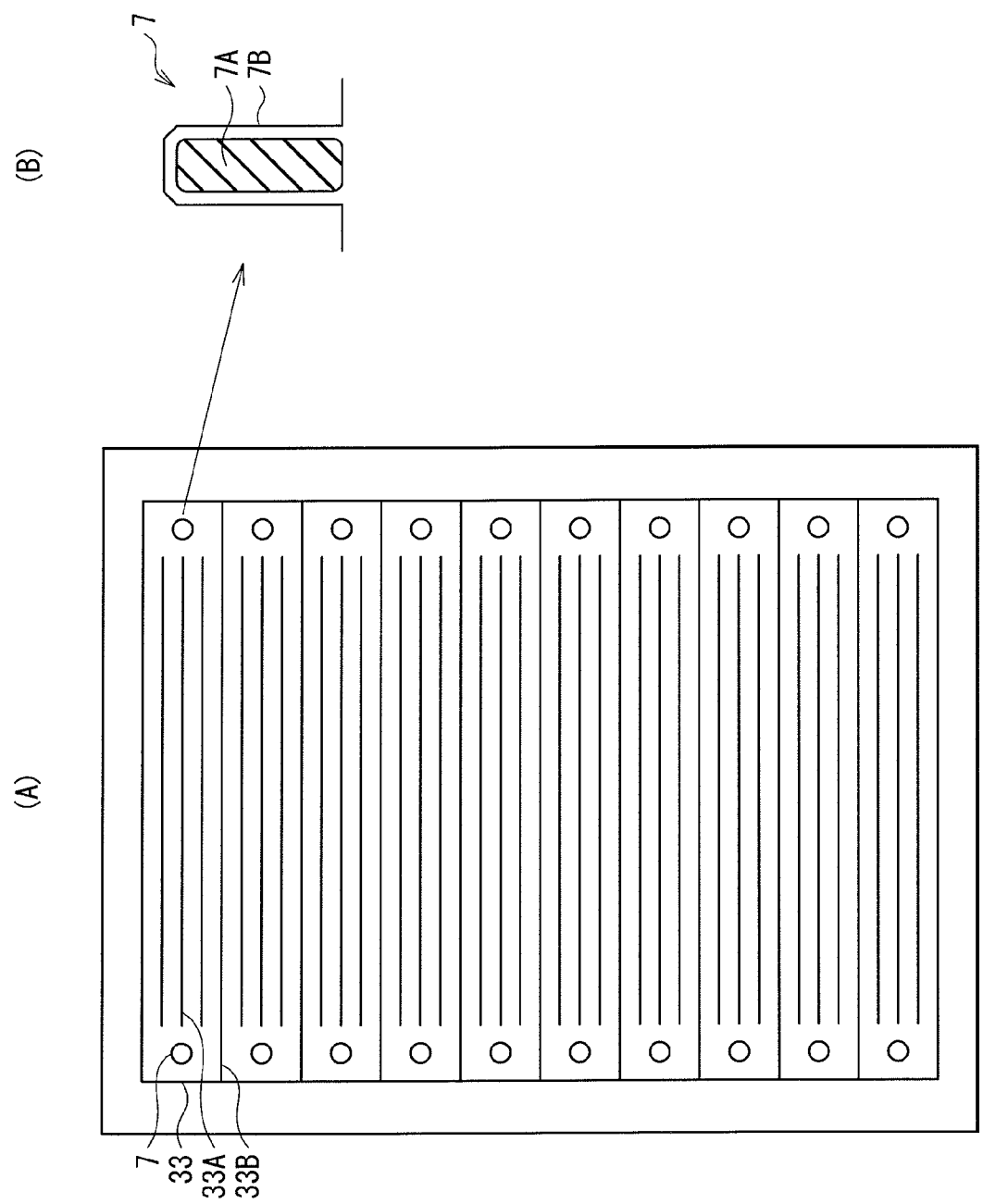

Part (A) of FIG. 10 is a plan view illustrating a connection structure of the drive electrodes and a pixel substrate in the touch detection function display unit illustrated in FIG. 5, and part (B) of FIG. 10 is a cross-sectional view illustrating a main part of a connection portion of the drive electrode and the pixel substrate.

Figure 11:
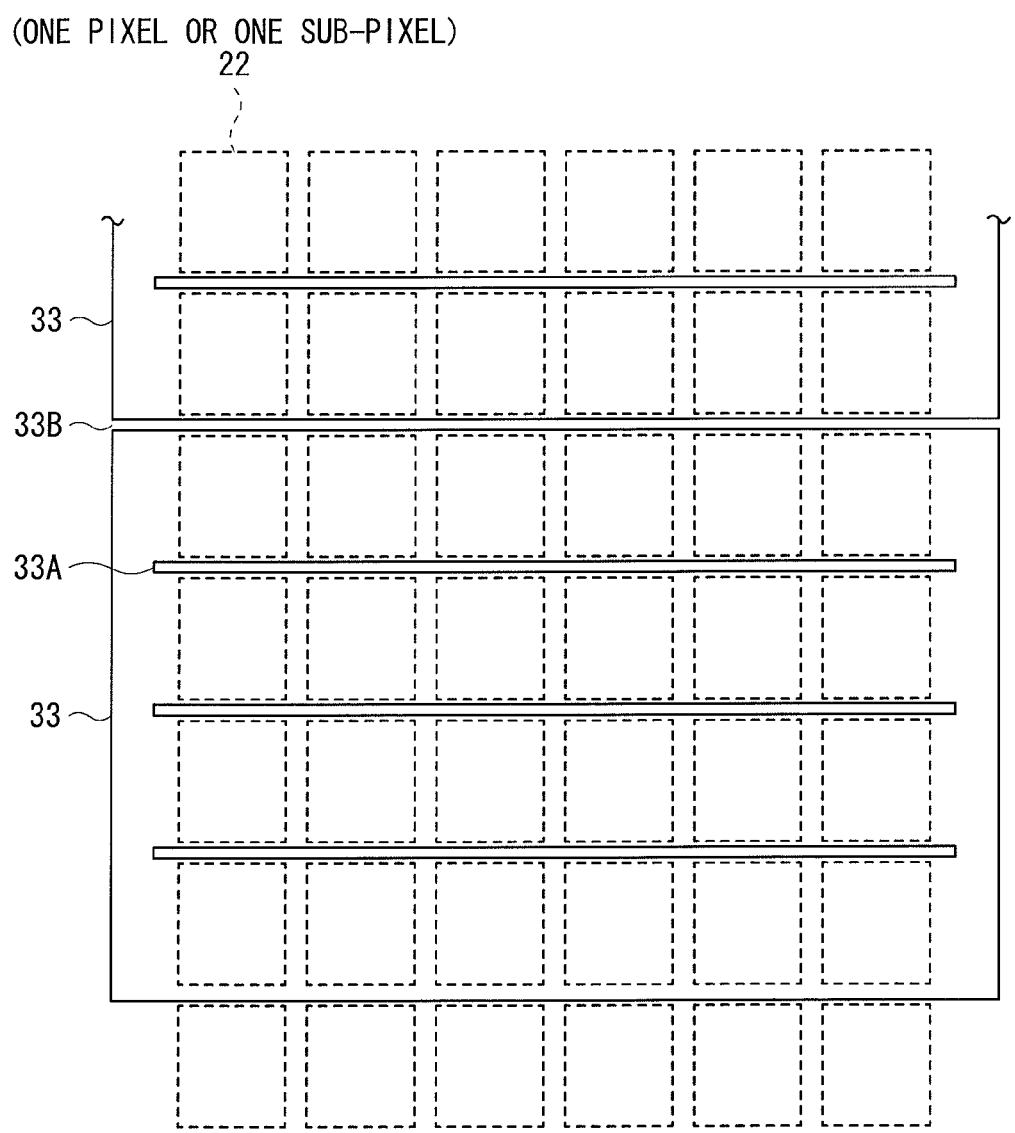

FIG. 11 is a plan view illustrating a correspondence relationship between the drive electrodes and pixel electrodes in the touch detection function display unit illustrated in FIG. 5.

Figure 12:
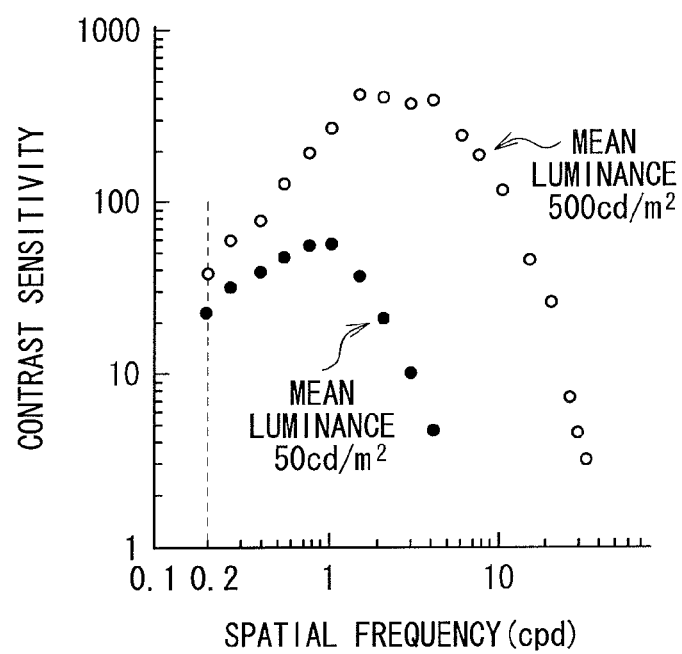

FIG. 12 is a characteristic diagram illustrating a human luminosity factor.

Figure 13:
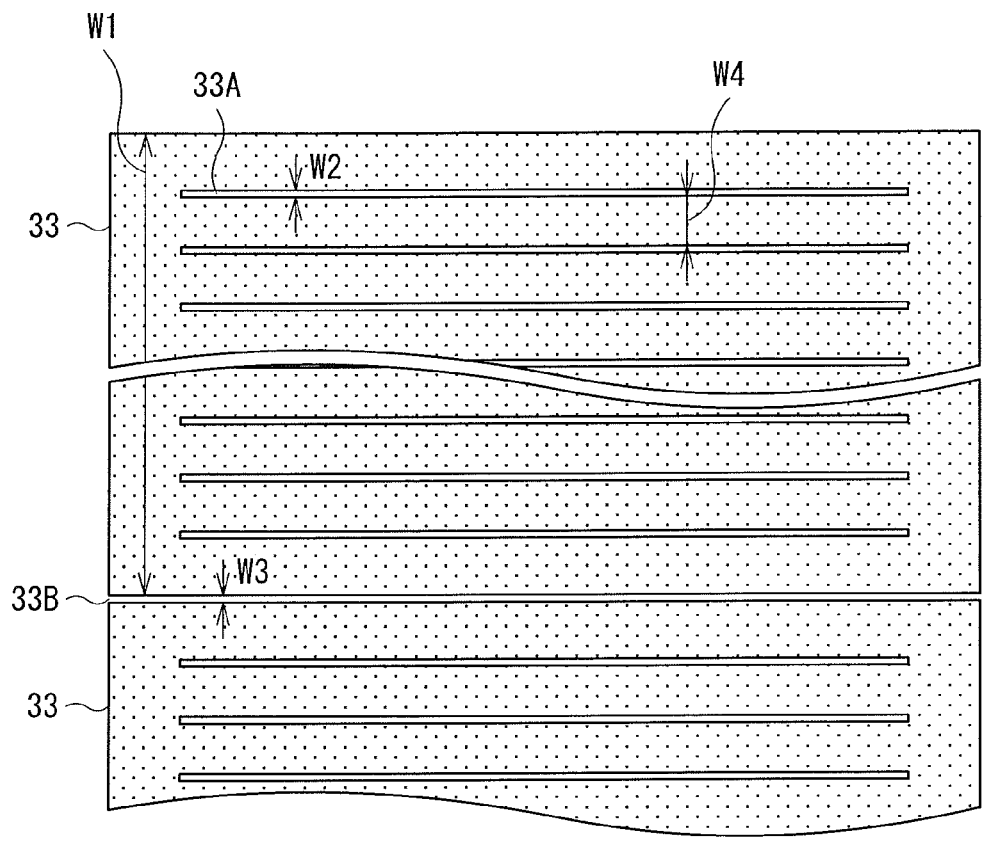

FIG. 13 is a plan view for describing a specific design example of the drive electrodes in the touch detection function display unit illustrated in FIG. 5.

Figure 14:
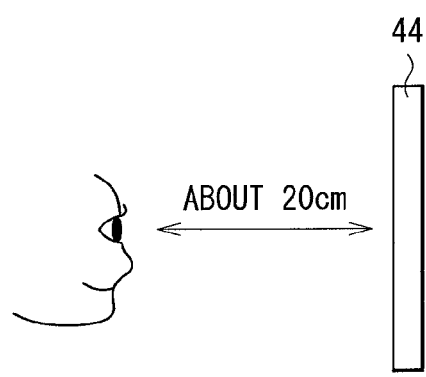

FIG. 14 describes a measurement environment of a specific example.

FIG. 15 describes a result of measurement on recognition of a slit when a pitch of the slit of a drive electrode is varied in the touch detection function display unit illustrated in FIG. 5.

Figure 16:
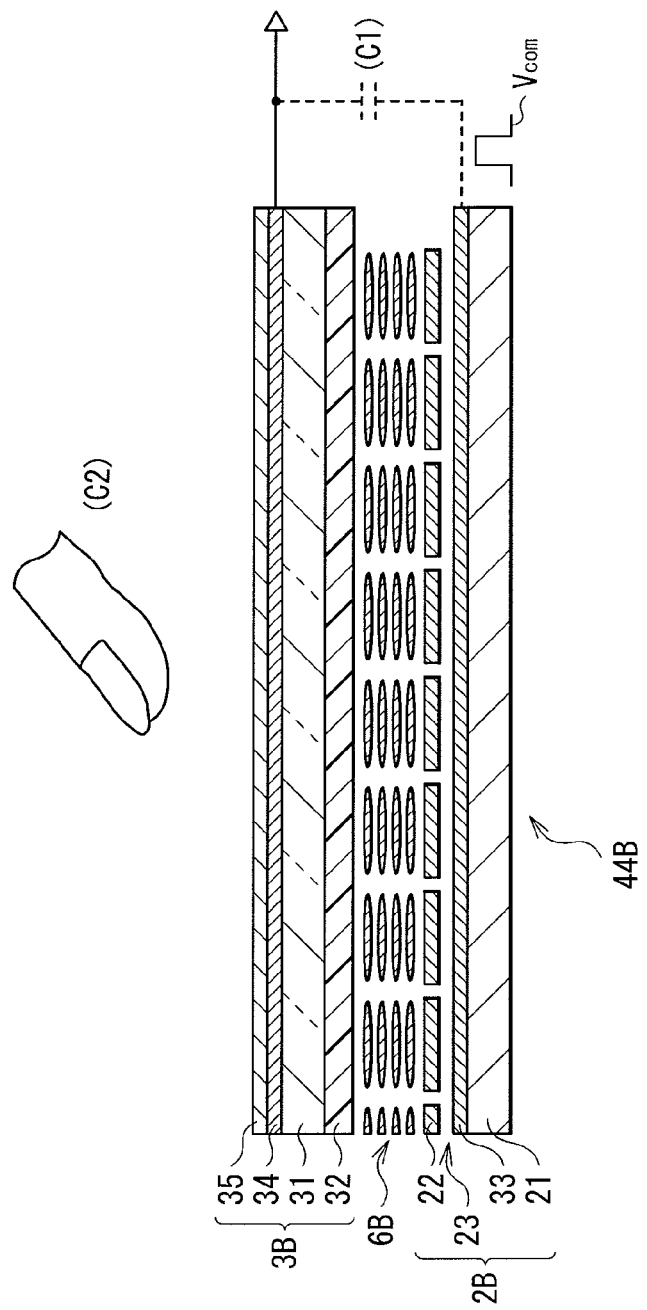

FIG. 16 is a cross-sectional view illustrating a schematic cross-sectional configuration of a display device with a touch detection function according to a second embodiment of the technology.

Figure 17B:
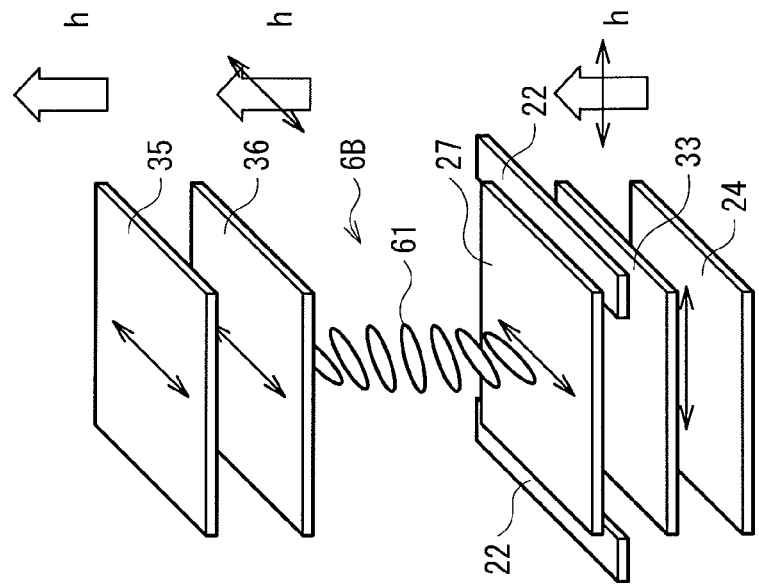
Figure 17A:
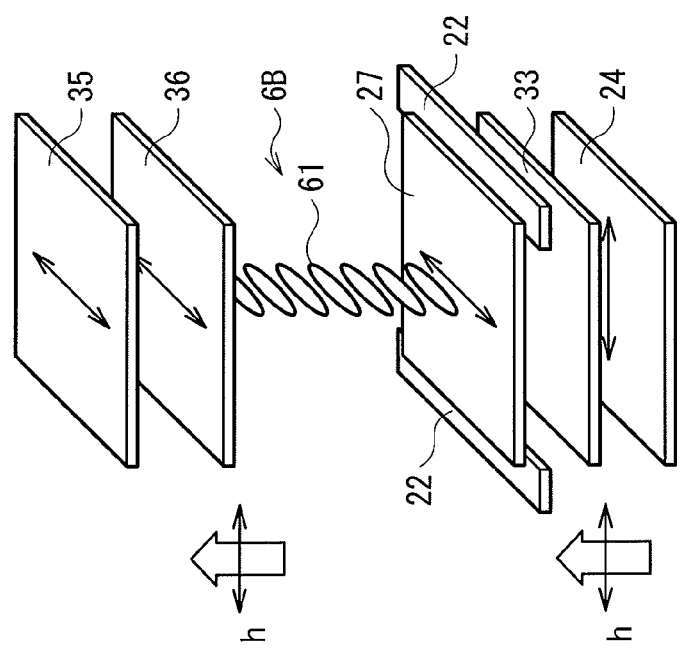

FIGS. 17A and 17B are enlarged perspective views illustrating a main part of the display device with the touch detection function illustrated in FIG. 16.

Figure 18A:
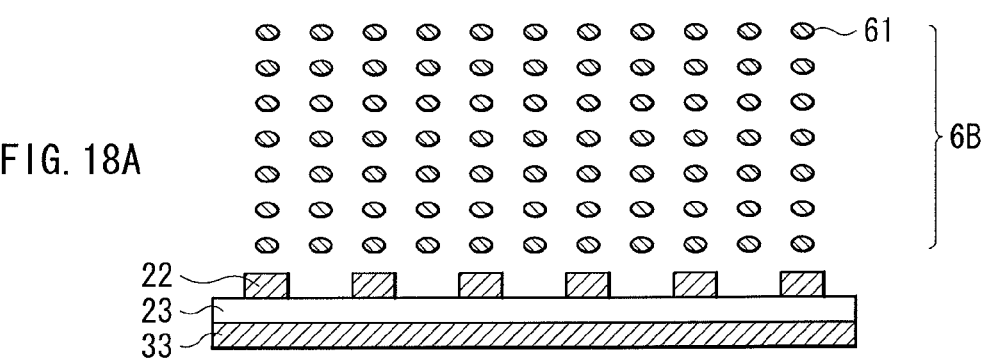
Figure 18B:
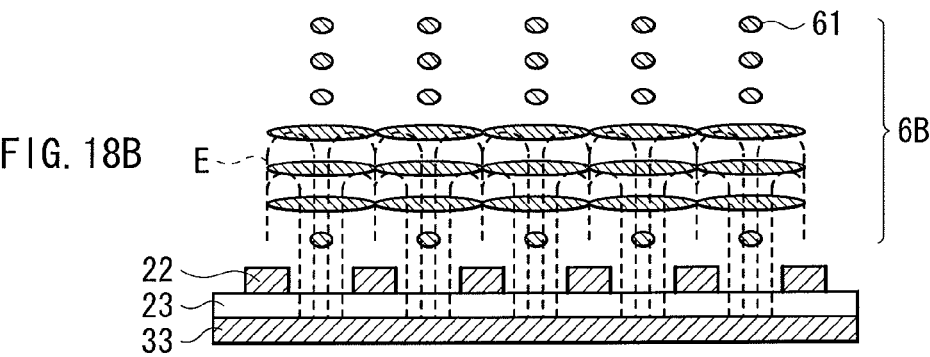

FIGS. 18A and 18B are cross-sectional views for describing an operation of the display device with the touch detection function illustrated in FIG. 16.

Figure 19:
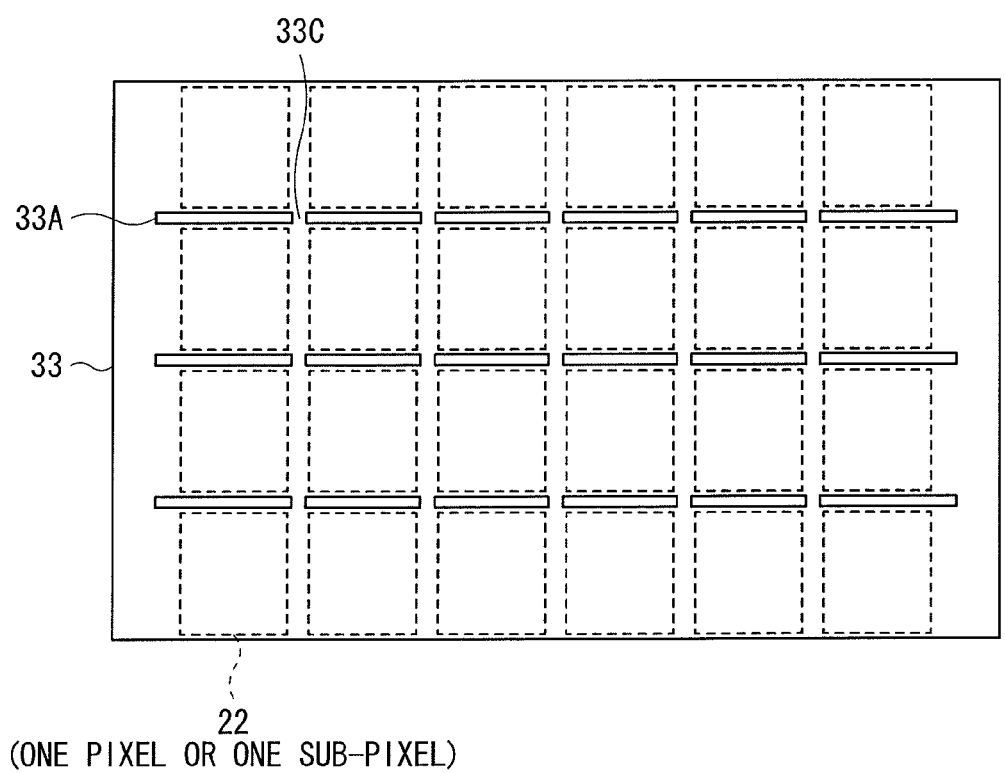

FIG. 19 is a plan view illustrating a configuration of drive electrodes in a display device with a touch detection function according to a third embodiment of the technology.

Figure 20:
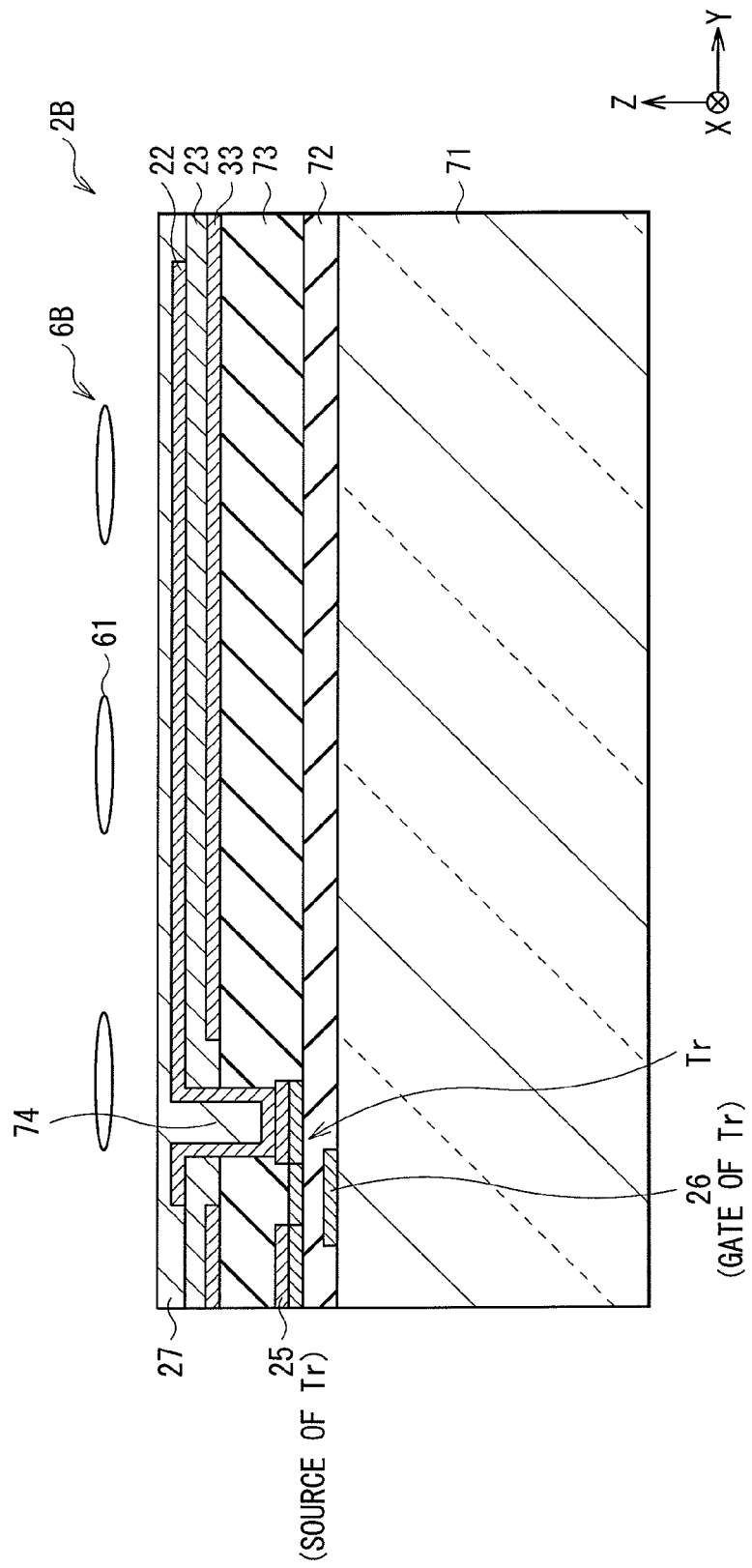

FIG. 20 is a cross-sectional view illustrating a cross-sectional configuration of a main part of a pixel substrate in the display device with the touch detection function illustrated in FIG. 19.

Figure 21:
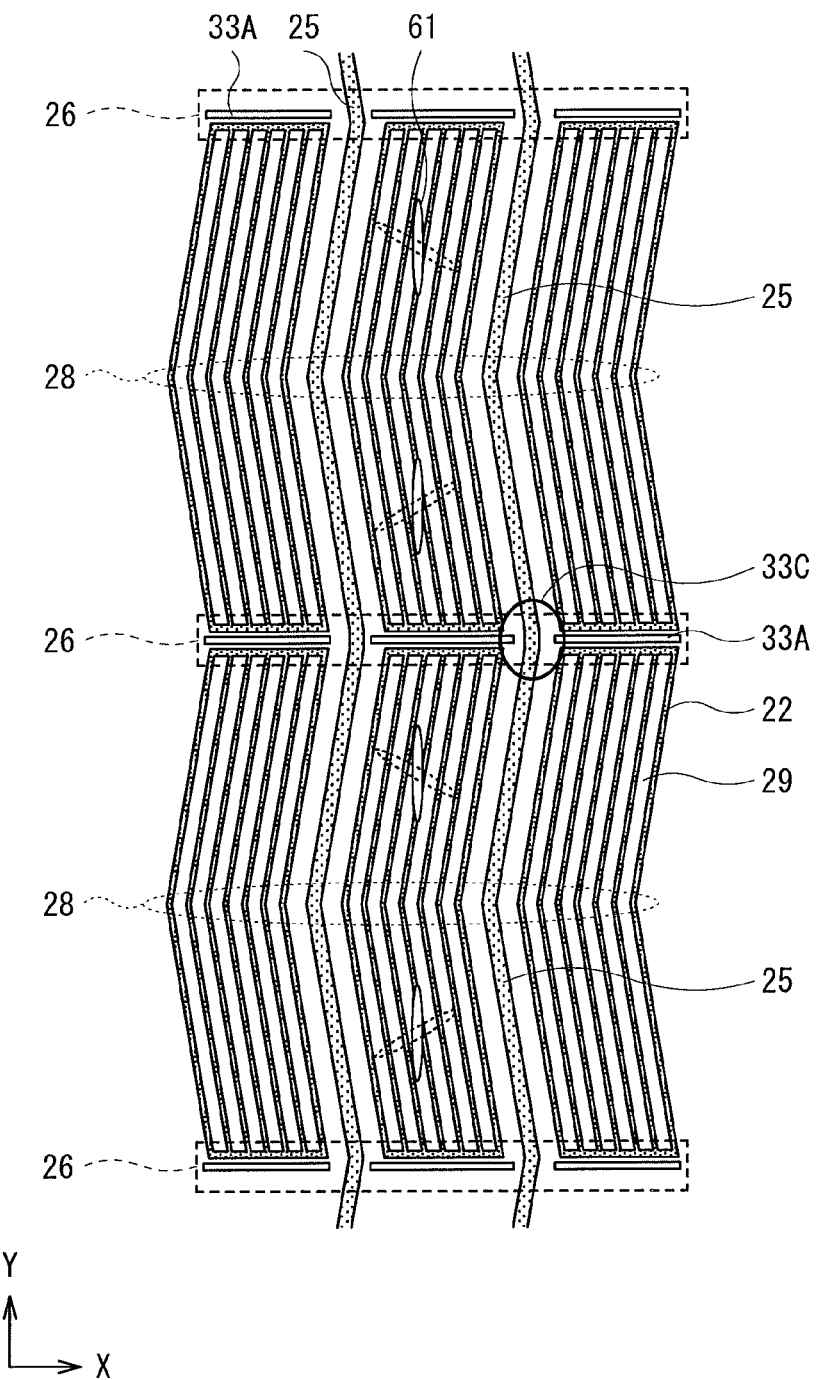

FIG. 21 is a plan view illustrating a plan configuration of the main part of the pixel substrate in the display device with the touch detection function illustrated in FIG. 20.

Figure 22:
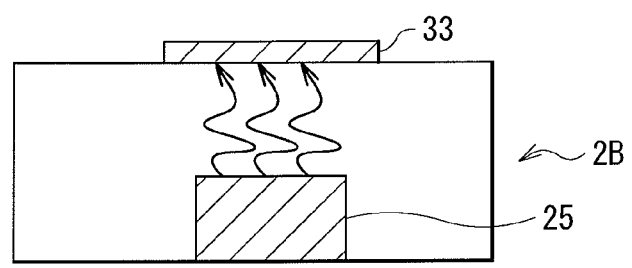

FIG. 22 describes an action of a drive electrode in the display device with the touch detection function illustrated in FIG. 20.

Figure 23:
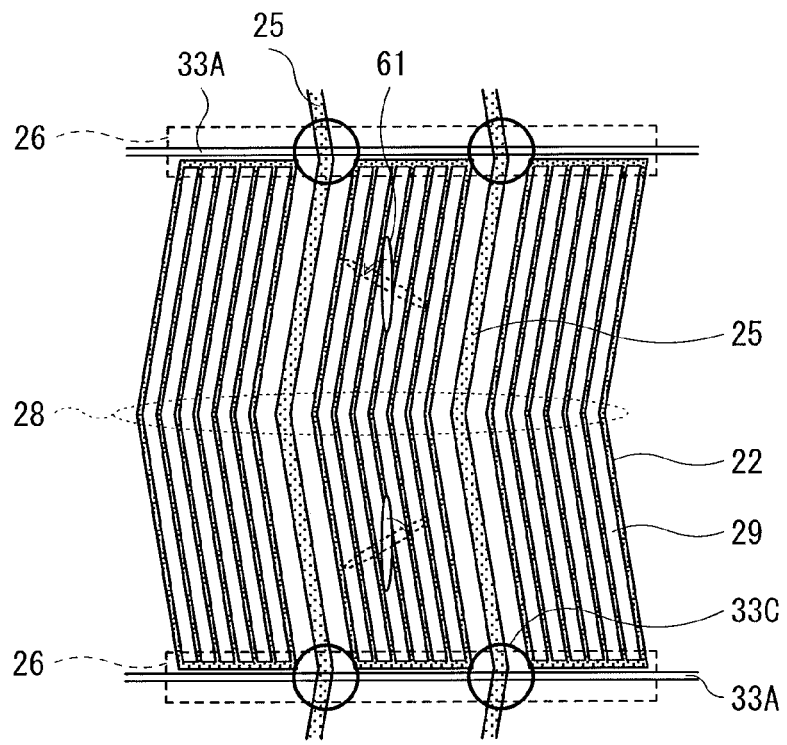

FIG. 23 is a plan view illustrating a plan configuration of a pixel substrate according to a comparative example with respect to the pixel substrate illustrated in FIG. 21.

Figure 24:
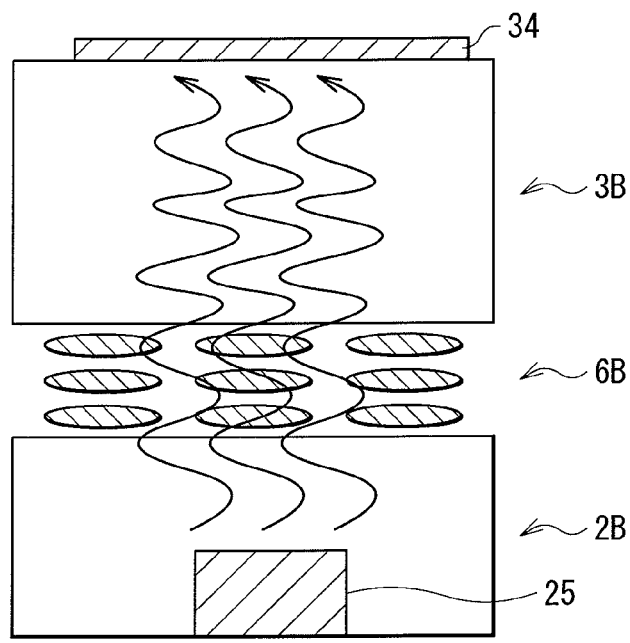

FIG. 24 describes a problem of a noise generated when the configuration according to the comparative example illustrated in FIG. 23 is employed.

Figure 25:
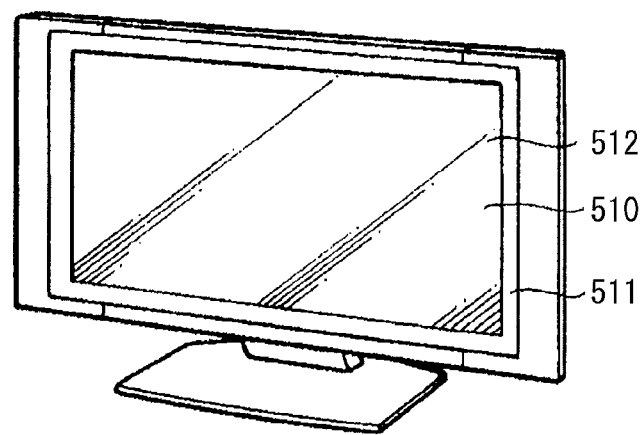

FIG. 25 is a perspective view schematically illustrating an external configuration of a first application example to which the display device with the touch detection function according to any one of the embodiments is applied.

Figure 26A:
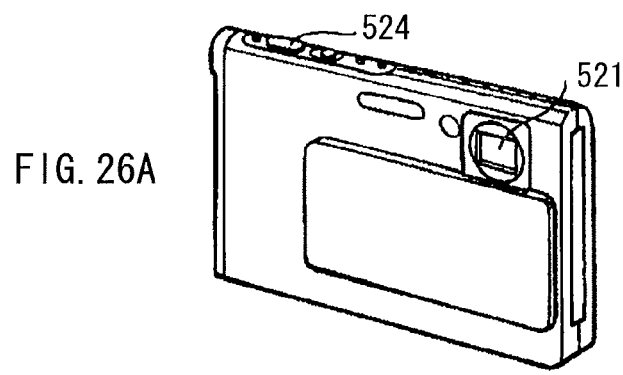
Figure 26B:
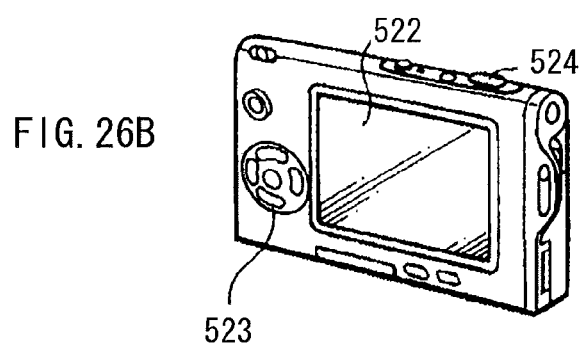

FIGS. 26A and 26B are perspective views illustrating an external configuration of a second application example as viewed from front and behind, respectively.

Figure 27:
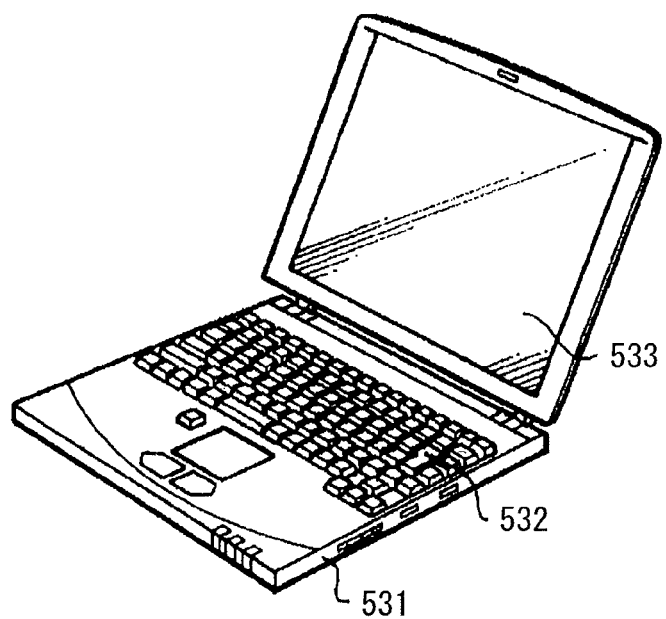

FIG. 27 is a perspective view illustrating an external configuration of a third application example.

Figure 28:
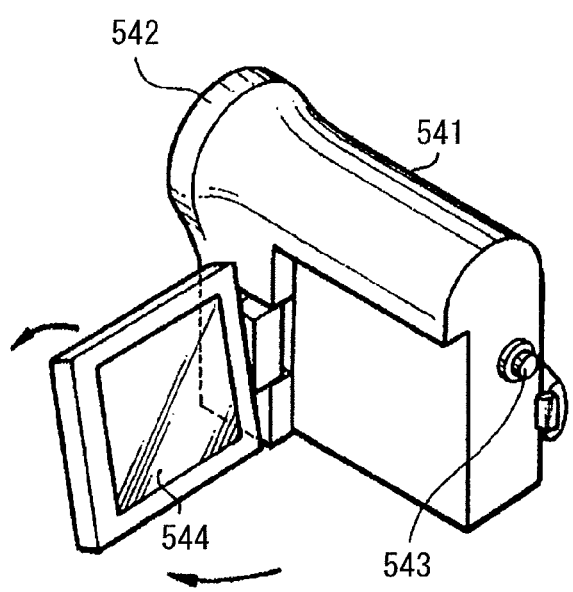

FIG. 28 is a perspective view illustrating an external configuration of a fourth application example.

FIG. 29A is a front view in an open state, FIG. 29B is a side view in the open state, FIG. 29C is a front view in a closed state, FIG. 29D is a left side view, FIG. 29E is a right side view, FIG. 29F is a top view, and FIG. 29G is a bottom view, each illustrating an external configuration of a fifth application example.

DETAILED DESCRIPTION

In the following, some embodiments of the technology will be described in detail with reference to the accompanying drawings.
(Basic Principle of Electrostatic Capacitance Type Touch Detection)

First, with reference to FIGS. 1 to 3, a basic principle of a touch detection in a display device with a touch detection function according to embodiments will be described. This touch detection scheme is embodied as an electrostatic capacitance type touch sensor. For example, as illustrated in (A) of FIG. 1, a pair of electrodes (a drive electrode E1 and a detection electrode E2), which are disposed to face each other with a dielectric D interposed in between, are used to configure a capacitor element C1. This configuration is representable as an equivalent circuit illustrated in (B) of FIG. 1. The capacitor element C1 is configured by the drive electrode E1, the detection electrode E2, and the dielectric D. The capacitor element C1 has a first end connected to an AC signal source (a drive signal source) S, and a second end P grounded through a resistor R and connected to a voltage detector (a detection circuit) DET. When an AC rectangular wave Sg ((B) of FIG. 3) having a predetermined frequency (for example, approximately several kHz to ten-odd kHz) is applied from the AC signal source S to the drive electrode E1 (the first end of the capacitor element C1), an output waveform (a detection signal Vdet) illustrated in (A) of FIG. 3 appears in the detection electrode E2 (the second end P of the capacitor element C1). This AC rectangular wave Sg is equivalent to a drive signal Vcom, which will be described later.

Figure 1:
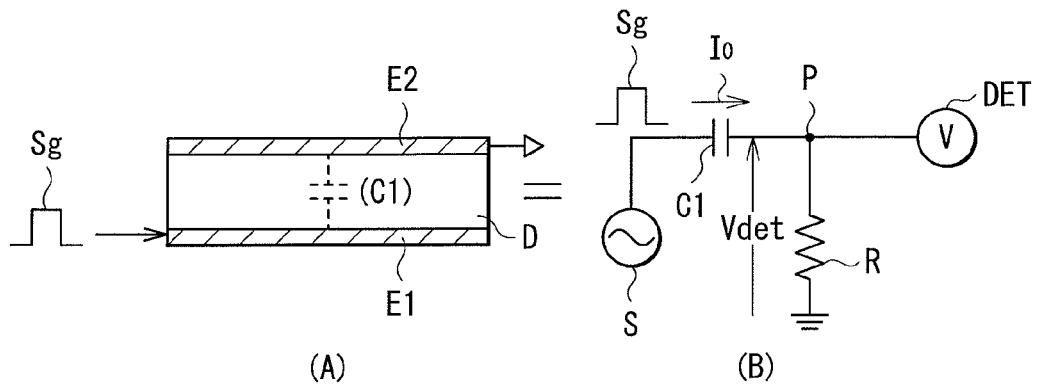
FIG. 1 is an explanatory diagram for describing a basic principle of a touch detection scheme in a display device with a touch detection function according to embodiments of the technology, and illustrates a case where an external proximity object such as a finger is not in a contact state nor is in a proximity state.

As illustrated in FIG. 1, in a case where an external proximity object (such as a finger in the exemplary embodiments, although a member such as a pen may be used) is not in a contact state nor is in a proximity state, a current I0 corresponding to a capacitance value of the capacitor element C1 flows in accordance with charge/discharge performed on the capacitor element C1. An electric potential waveform of the second end P in the capacitor element C1 at this time is, for example, as illustrated by a waveform V0 in (A) of FIG. 3, which is detected by the voltage detector DET.

Figure 2:
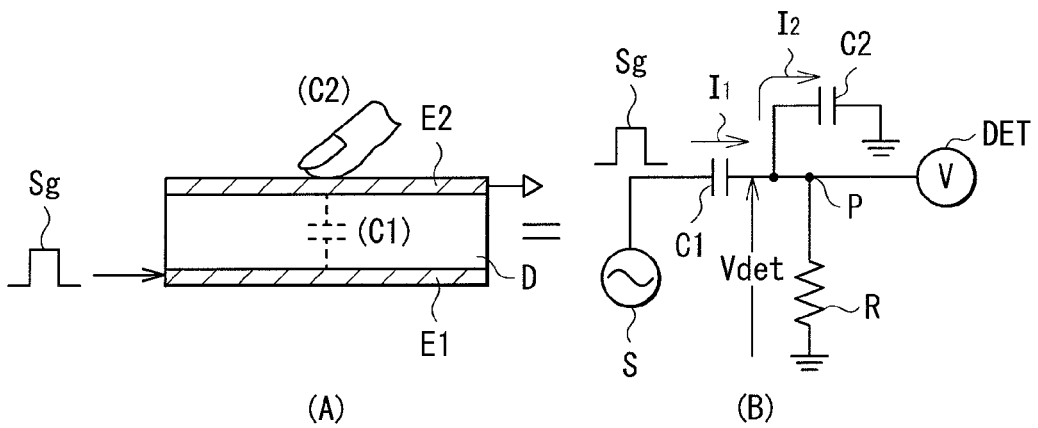
FIG. 2 is an explanatory diagram for describing the basic principle of the touch detection scheme in the display device with the touch detection function according to the embodiments, and illustrates a case where the finger is in the contact state or is in the proximity state.
Figure 3:
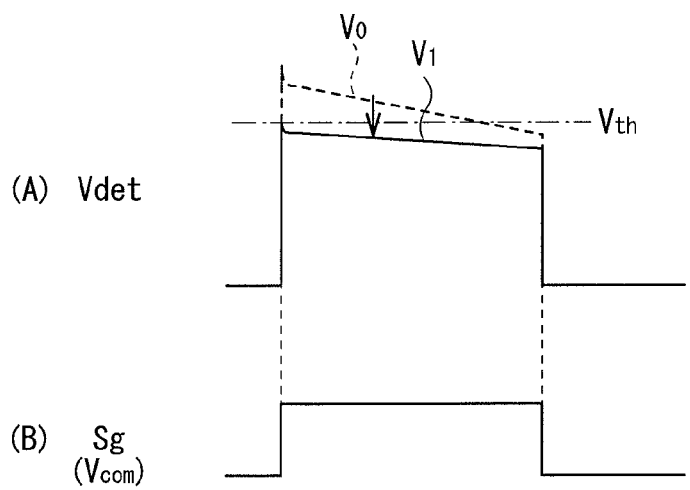
FIG. 3 is an explanatory diagram for describing the basic principle of the touch detection scheme in the display device with the touch detection function according to the embodiments, and illustrates an example of a waveform of a drive signal and an example of a waveform of a detection signal.

On the other hand, in a case where the finger is in the contact state or is in the proximity state, a capacitor element C2 formed by the finger is added in series to the capacitor element C1, as illustrated in FIG. 2. In this state, when charge/discharge is performed on the capacitor elements C1 and C2, currents I1 and I2 flow, respectively. The electric potential waveform of the second end P in the capacitor element C1 at this time is, for example, as illustrated by a waveform V1 in (A) of FIG. 3, which is detected by the voltage detector DET. Here, an electric potential at the second end P is a divided electric potential determined by values of the currents I1 and I2 flowing through the capacitor elements C1 and C2, respectively. Hence, the waveform V1 is smaller in value than the waveform V0 derived from the non-contact state or from the non-proximity state. The voltage detector DET compares the detected voltage with a predetermined threshold voltage Vth. The voltage detector DET determines that the finger is in the non-contact state or is in the non-proximity state when the detected voltage is equal to or larger than the threshold voltage Vth, whereas, the detector DET determines that the finger is in the contact state or is in the proximity state when the detected voltage is smaller than the threshold voltage Vth, thereby making it possible to perform the touch detection.

First Embodiment

Configuration Example (Overall Configuration)

Figure 4:
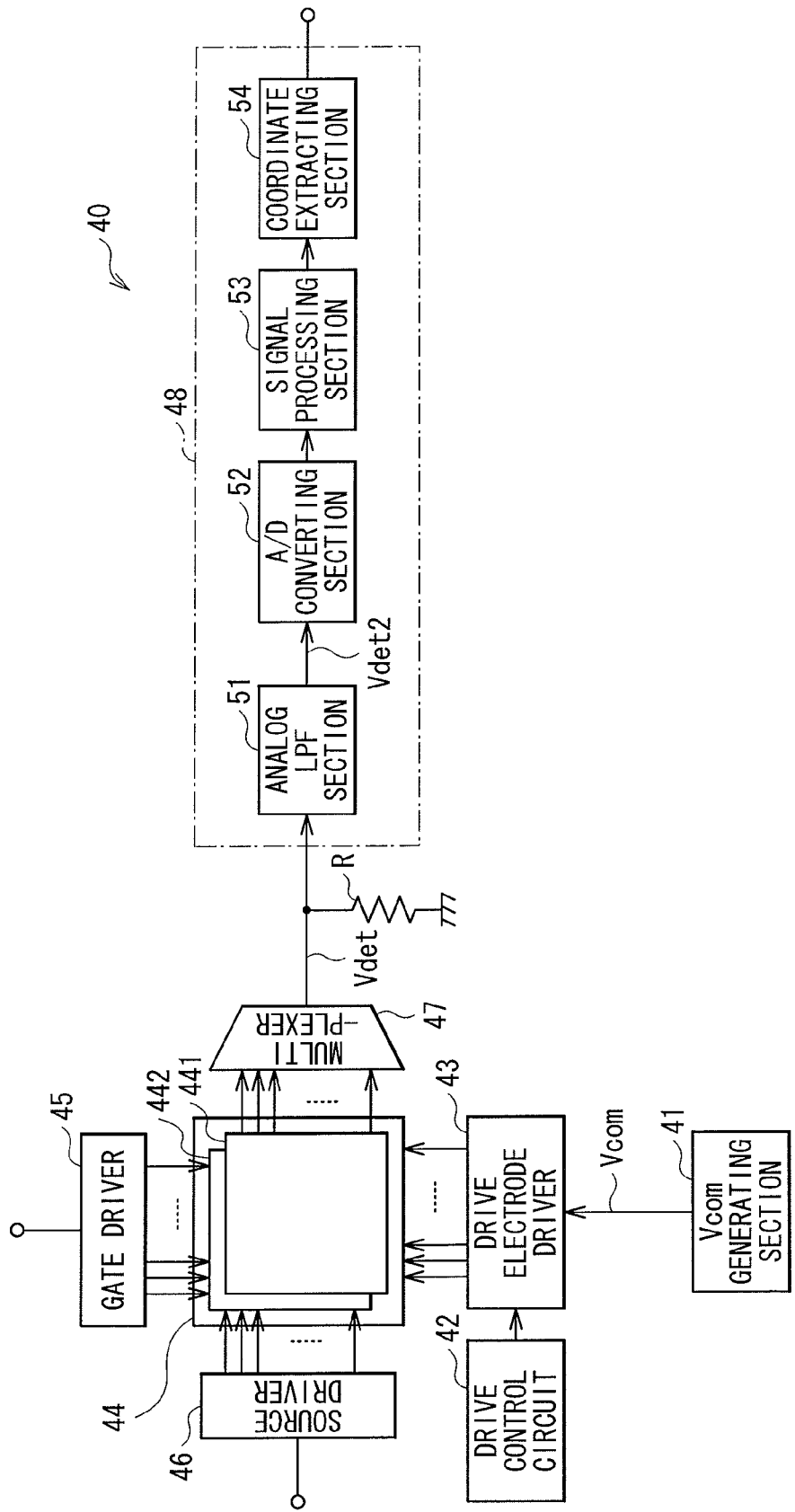
FIG. 4 is a block diagram illustrating an exemplary configuration of a display device with a touch detection function according to the embodiments of the technology.

FIG. 4 illustrates an exemplary configuration of a display device with a touch detection function 40 according to a first embodiment of the technology. The display device with the touch detection function according to this embodiment is a device of a so-called "in-cell" type, in which a liquid crystal display element is used as a display element, and in which a liquid crystal display unit, configured by the liquid crystal display element, and a touch sensor of an electrostatic capacitance type are integrated.

The display device with the touch detection function 40 is provided with a Vcom generating section 41, a drive control circuit 42, a drive electrode driver 43, a display unit with a touch detection function (hereinafter simply referred to as a "touch detection function display unit") 44, a gate driver 45, a source driver 46, a multiplexer 47, a detection circuit 48, and a resistor R.

The Vcom generating section 41 serves as a circuit by which the drive signal Vcom used in the touch detection function display unit 44 is generated. The drive signal Vcom may have a rectangular wave, for example.

The drive control circuit 42 serves as a circuit which, when supplying a later-described plurality of drive electrodes in the touch detection function display unit 44 with the drive signal Vcom supplied from the Vcom generating section 41, selects the drive electrodes to control the same. In controlling the drive electrodes, the drive control circuit 42 controls a movement of scanning of the drive electrodes subjected to application of the drive signal Vcom, for example.

The drive electrode driver 43 serves as a circuit which supplies, based on a control signal supplied from the drive control circuit 42, the later-described plurality of drive electrodes in the touch detection function display unit 44 with the drive signal Vcom supplied from the Vcom generating section 41.

The touch detection function display unit 44 includes a touch sensor 441 and a liquid crystal display unit 442 (a display section). The touch sensor 441 operates and outputs, based on the basic principle of the electrostatic capacitance type touch detection described above, the detection signal Vdet. The detection signal Vdet includes a signal component derived from a touch operation.

The gate driver 45 serves as a circuit which supplies the liquid crystal display unit 442 with a signal by which a horizontal pixel line subjected to displaying is selected. The source driver 46 serves as a circuit which supplies the liquid crystal display unit 442 with an image signal. The multiplexer 47 serves as a circuit which, when obtaining in order the detection signal Vdet from the later-described plurality of touch detection electrodes of the touch sensor 441, switches the sources from which the detection signal Vdet is to be obtained.

The detection circuit 48 detects, based on the detection signal Vdet switched over in the multiplexer 47, a presence or absence of the touch performed on the touch sensor 441, and further obtains a coordinate thereof on the touch panel, for example. The detection circuit 48 includes an analog LPF (Low Pass Filter) section 51, an A/D (Analog-to-Digital) converting section 52, a signal processing section 53, and a coordinate extracting section 54. The analog LPF section 51 serves as a low-pass analog filter which removes a high-frequency component from detection signal Vdet, and outputs the detection signal Vdet subjected to the high-frequency component removal. The analog LPF section 51 may remove a folding noise generated in the A/D converting section 52, for example. The A/D converting section 52 serves as a circuit which converts the analog signal supplied from the analog LPF section 51 into a digital signal. The signal processing section 53 serves as a logic circuit which, based on an output signal from the A/D converting section 52, detects the presence or absence of the touch performed on the touch sensor 441. The coordinate extracting section 54 serves as a logic circuit which obtains a touch panel coordinate at which the touch detection has been performed in the signal processing section 53.

The circuits described above are controlled by an unillustrated timing controlling section.

(Exemplary Configuration of Touch Detection Function Display Unit 44)

FIG. 5 illustrates an example of a cross-sectional configuration of a main part of the touch detection function display unit 44. The touch detection function display unit 44 includes a pixel substrate 2, an opposed substrate 3 disposed to face the pixel substrate 2, and a liquid crystal layer 6 inserted between the pixel substrate 2 and the opposed substrate 3.

The pixel substrate 2 includes a TFT (Thin-Film Transistor) substrate 21 serving as a circuit board, and a plurality of pixel electrodes 22 disposed in matrix in a first direction (a horizontal direction) and a second direction (a perpendicular direction) on the TFT substrate 21. As will be described later with reference to FIG. 6, the TFT substrate 21 is formed with TFTs for respective pixels, and wirings such as source lines (image signal wirings) for supplying the image signal to the respective pixel electrodes 22, gate lines for driving the respective TFTs, and drive signal wirings for supplying the drive signal to the later-described drive electrodes 33. Also, the pixel substrate 2 may be formed to include a part or all of the circuits illustrated in FIG. 4.

The opposed substrate 3 includes a glass substrate 31, a color filter 32 formed on a first surface of the glass substrate 31, and the drive electrodes 33 formed on the color filter 32. The color filter 32 has a configuration in which, for example, color filter layers of three colors of red (R), green (G), and blue (B) are periodically aligned. Here, a set of three colors of R, G and B is assigned to each display pixel, although the number of colors and the types of colors are not limited thereto. The drive electrode 33 serves as a common drive electrode of the liquid crystal display unit 442, and also serves as the drive electrode of the touch sensor 441. The drive electrode 33 is coupled to the TFT substrate 21 by a contact conductive pillar 7. The drive signal Vcom having an AC rectangular waveform is applied from the TFT substrate 21 through the contact conductive pillar 7 to the drive electrode 33. The drive signal Vcom, together with a pixel voltage applied to the pixel electrodes 22, defines a display voltage of each of the pixels, and may also be referred to as a common drive signal. Further, the drive signal Vcom is used also as the drive signal of the touch sensor 441.

A second surface of the glass substrate 31 is formed with the touch detection electrodes 34 serving as detection electrodes of the touch sensor 441. Also, a polarizing plate 35 is disposed on the touch detection electrodes 34.

The liquid crystal layer 6 modulates light passing therethrough in response to a state of an electric field, and is configured of a liquid crystal in any of various modes such as a TN (Twisted Nematic) mode and an ECB (Electrically-Controlled Birefringence) mode.

Alignment films are respectively disposed between the liquid crystal layer 6 and the pixel substrate 2 and between the liquid crystal layer 6 and the opposed substrate 3, and a light-incident side polarizing plate is disposed below the pixel substrate 2, illustrations of which are omitted in the drawings.

Figure 6:
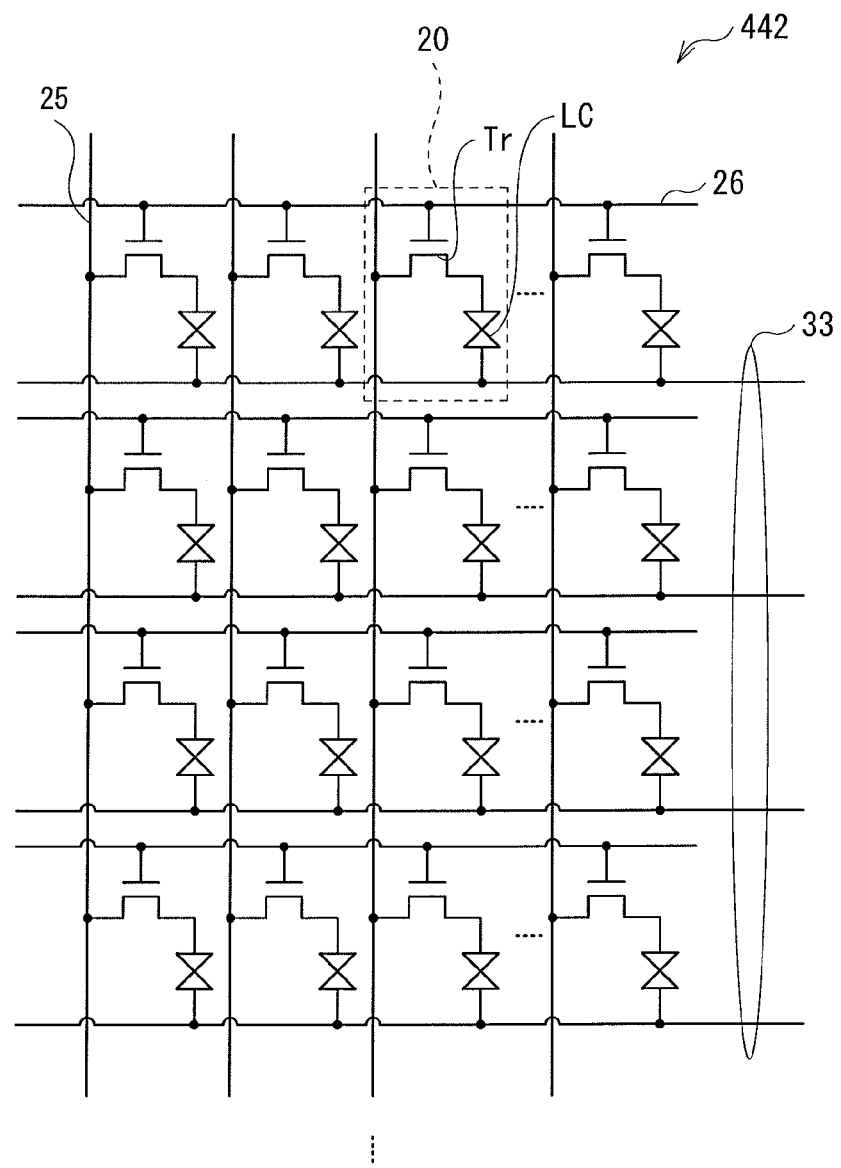
FIG. 6 is a circuit diagram illustrating a pixel array of the touch detection function display unit illustrated in FIG. 5.

FIG. 6 illustrates an example of a pixel configuration in the liquid crystal display unit 442. The liquid crystal display unit 442 includes the plurality of display pixels 20 which are arranged in matrix. The display pixel 20 includes a TFT element Tr and a liquid crystal element LC.

The display pixel 20 is connected with a source line 25, a gate line 26, and the drive electrode 33. The source line 25 serves as a signal line for supplying the image signal to each of the display pixels 20, and is connected to the source driver 46 illustrated in FIG. 4. The gate line 26 serves as a signal line (a scanning line) for supplying the signal by which the display pixels 20 subjected to displaying are selected, and is connected to the gate driver 45 illustrated in FIG. 4. In this embodiment, each of the gate lines 26 is connected to all of the display pixels 20 which are disposed horizontally. In other words, in the liquid crystal display unit 442, the displaying is performed one display horizontal line at a time based on the control signal from each of the gate lines 26.

The drive electrode 33 serves as an electrode for applying the drive signal used for driving the liquid crystals, and is connected to the drive electrode driver 43 illustrated in FIG. 4. Each of the drive electrodes 33 is a strip-like electrode that extends in the first direction (the horizontal direction), and is arranged in a side-by-side fashion in the second direction (the perpendicular direction), as will be described later. Further, the respective drive electrodes 33 correspond to the horizontal pixel lines (four horizontal pixel lines in FIG. 6). In other words, in the liquid crystal display unit 442, the plurality of horizontal pixel lines are driven collectively based on the drive signal of each of the drive electrodes 33.

Figure 7:
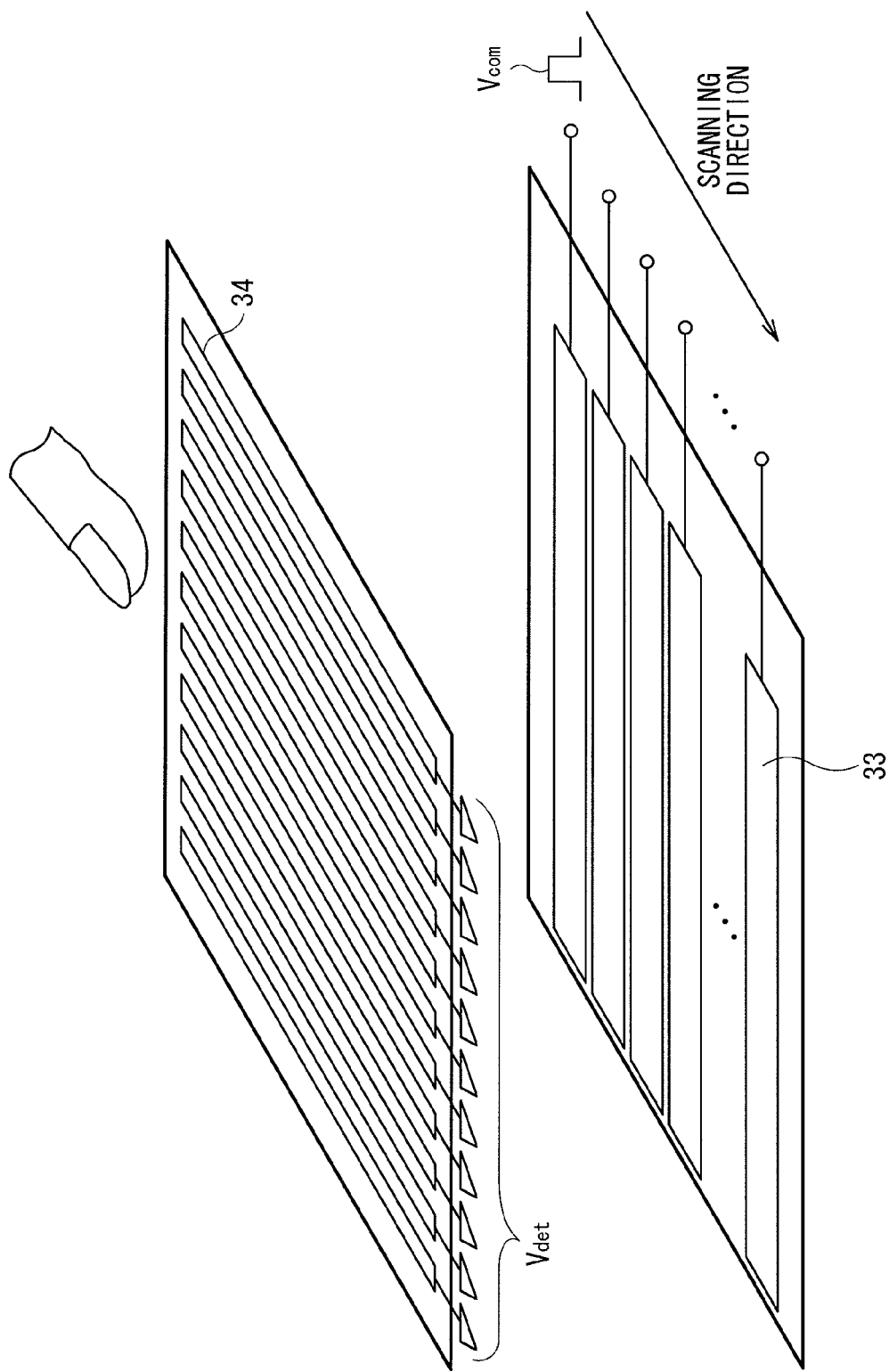
FIG. 7 is a perspective view illustrating an exemplary configuration of drive electrodes and that of touch detection electrodes of the touch detection function display unit illustrated in FIG. 5.
Figure 8:
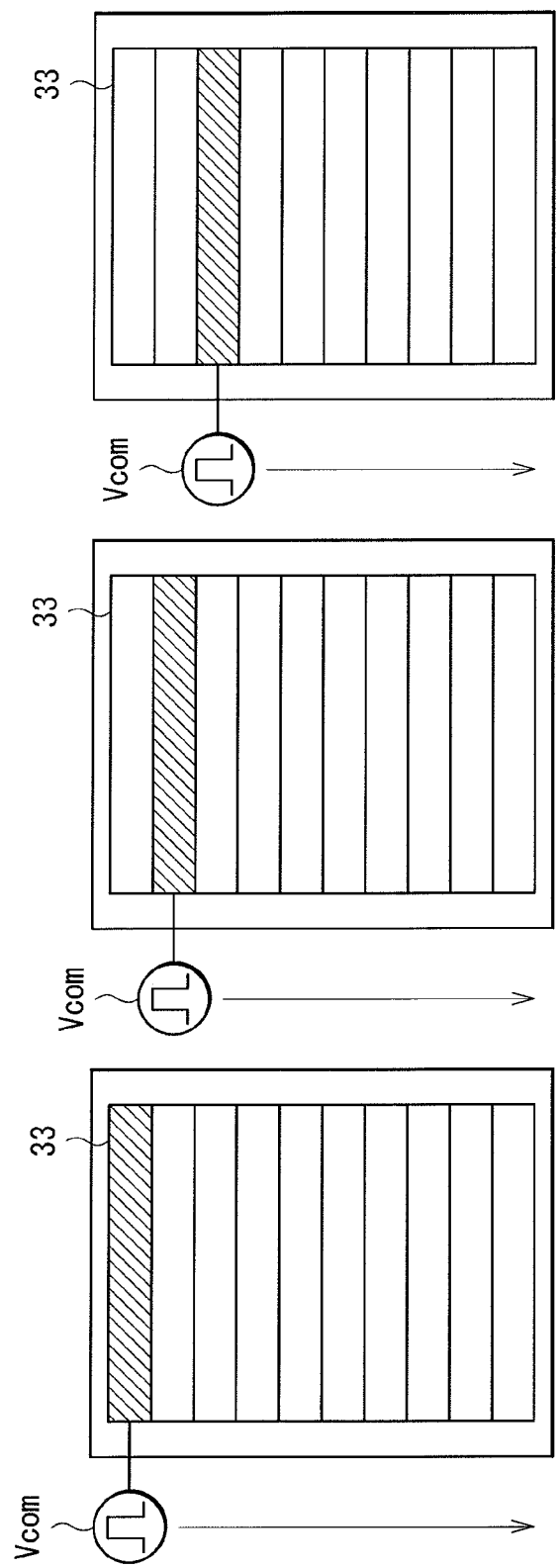
FIGS. 8A to 8C describe a scanning method of the drive electrodes in the touch detection function display unit illustrated in FIG. 5.

FIG. 7 is a perspective view illustrating an exemplary configuration with respect to the touch sensor 441 of the drive electrodes 33 and the touch detection electrodes 34 in the opposed substrate 3. Each of the drive electrodes 33 is a strip-like electrode that extends in the first direction (the horizontal direction), and is arranged in a side-by-side fashion in the second direction (the perpendicular direction). Each of the drive electrodes 33 is sequentially supplied with the drive signal Vcom by the drive electrode driver 43 illustrated in FIG. 4, and is thus driven based on the sequential scanning performed in a time-divisional fashion as illustrated in FIGS. 8A to 8C. On the other hand, each of the touch detection electrodes 34 is configured of a strip-like electrode pattern extending in a direction orthogonal to the extending direction of electrode patterns of the drive electrodes 33. Each of the electrode patterns of the touch detection electrodes 34 outputs the detection signal Vdet, which is supplied to the detection circuit 48 through the multiplexer 47 illustrated in FIG. 4.

The electrode patterns which intersect one another by the drive electrode 33 and the touch detection electrode 34 form an electrostatic capacitance at a location at which the drive electrode 33 and the touch detection electrode 34 intersect each other. The drive electrode 33 corresponds to the drive electrode E1 whereas the touch detection electrode 34 corresponds to the touch detection electrode E2 in the basic principle of the touch detection described above with reference to FIGS. 1 and 2. Hence, the touch sensor 441 can detect the touch in accordance with the basic principle discussed above. Further, the electrode patterns that intersect one another configure the touch sensor 441 having a matrix configuration. Hence, detection of a position at which a contact or proximity of an object has occurred is possible.

(Detailed Exemplary Configuration of Drive Electrode 33)

Figure 9:
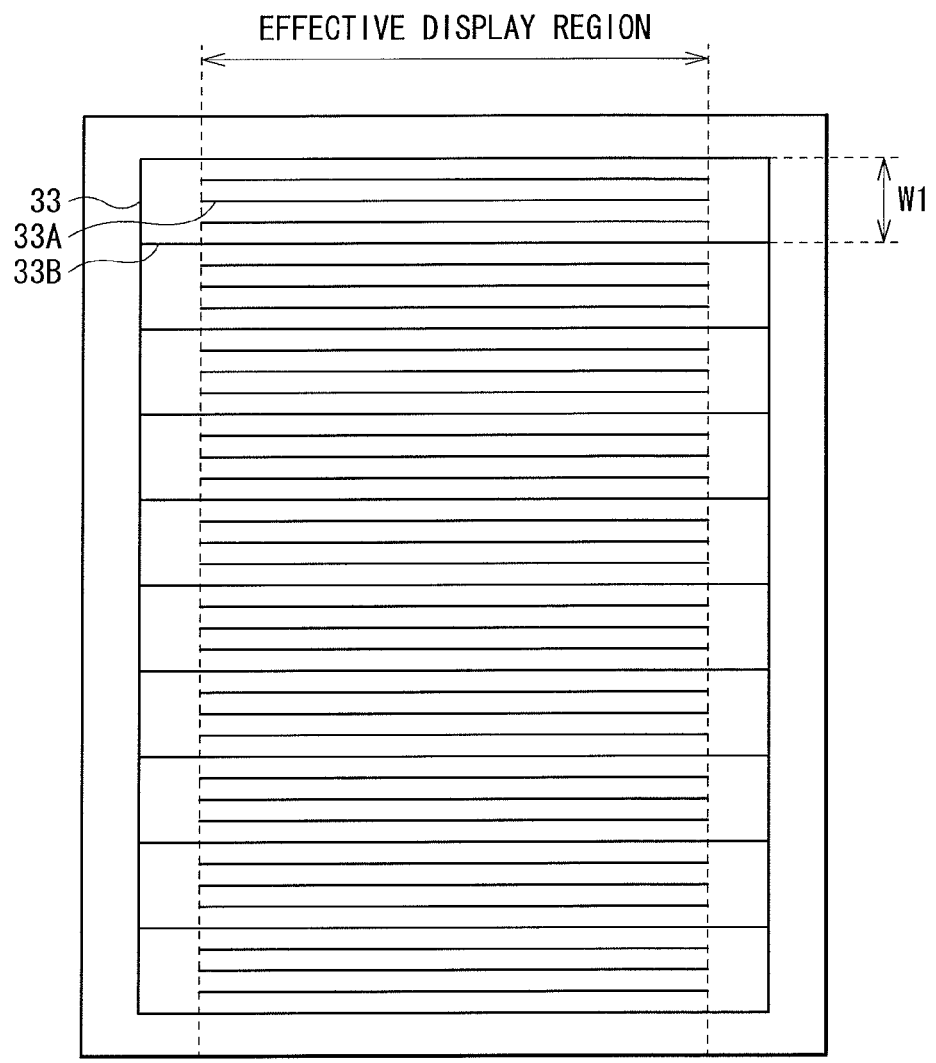
FIG. 9 is a plan view illustrating a detailed exemplary configuration of the drive electrodes in the touch detection function display unit illustrated in FIG. 5.

FIGS. 9 and 11 each illustrate a detailed exemplary configuration of the plurality of drive electrodes 33. Note that FIG. 11 is equivalent to illustration in which FIG. 9 is partially enlarged, although a ratio in FIG. 11 of a length in the horizontal direction and a length in the perpendicular direction is changed as compared with that of FIG. 9 for the purpose of easier understanding of an electrode configuration. Also, in FIG. 9, a size of the pixel electrode 22 is equivalent to a size of a single pixel or a single sub-pixel. A width W1 of the single drive electrode 33 has a size corresponding to two or more pixel electrodes 22 (four pixel electrodes 22 in FIG. 11) in the second direction (the perpendicular direction). Each of the drive electrodes 33 has an inner-electrode slit 33A so provided as to extend in the first direction (the horizontal direction). An inter-electrode slit 33B that corresponds to the inner-electrode slit 33A is formed between the two adjacent drive electrodes 33. Each of the drive electrodes 33 has a length which is larger than that of an effective display region in the display section (the liquid crystal display unit 442 as illustrated in FIG. 4) in the first direction. The inner-electrode slit 33A is provided at least within the effective display region as illustrated in FIG. 9.

Each of the drive electrodes 33 is connected to the drive signal wiring formed on the TFT substrate 21 (FIG. 5) through the contact conductive pillar 7 (FIG. 5). FIG. 10 illustrates an exemplified connection structure utilizing the contact conductive pillar 7 (a contact portion). The contact conductive pillar 7 is provided outside of the effective display region. Part (A) of FIG. 10 illustrates an example where the contact conductive pillars 7 are provided at positions that are further outside of the inner-electrode slits 33A provided in the effective display region and that are on either side of the respective drive electrodes 33. As illustrated in part (B) of FIG. 10, the contact conductive pillar 7 has a pillar portion 7A, and a conductive film 7B that covers the pillar portion 7A. Alternatively, a configuration may be employed where the conduction is accomplished by using an anisotropic conductive film (ACF), instead of the configuration utilizing the contact conductive pillar 7 illustrated in part (B) of FIG. 10. The anisotropic conductive film is a film that may be obtained by mixing a thermosetting resin with fine metallic particles and forming a thus-obtained resultant into a film. When the anisotropic conductive film is sandwiched between two component parts and is pressurized while applying a heat, the metallic particles dispersed in the film contact one another and thus form a conductive path.

Each of the drive electrodes 33 has one or more inner-electrode slits 33A. FIGS. 9 and 11 each illustrate an example where each of the drive electrodes 33 includes three inner-electrode slits 33A, although it is not limited thereto. A spacing in the second direction between the adjacent inner-electrode slits 33A (when the drive electrode 33 has two or more inner-electrode slits 33A), and a spacing in the second direction between the inner-electrode slit 33A and the inter-electrode slit 33B that are adjacent to each other, are each set to have a size corresponding to the single pixel electrode 22. Thus, as illustrated in FIG. 11, the inner-electrode slit 33A and the inter-electrode slit 33B are each located between the two pixel electrodes 22 that are adjacent to each other (or the two adjacent sub pixels).

Referring now to FIGS. 12 and 13, a specific design example of the drive electrode 33 will be described. FIG. 12 illustrates a human luminosity factor (a spatial frequency characteristic). When a size such as a width of the inner-electrode slit 33A and the inter-electrode slit 33B is increased excessively, orientation states of liquid crystal molecules are varied greatly between a portion which is between the pixels and a portion which is inside of the pixel due to an influence of a lateral electric field to cause a defect. When this becomes prominent, a leakage of light occurs from a portion having the defect at the time of black displaying, reducing a contrast significantly. A width W2 of the inner-electrode slit 33A and a width W3 of the inter-electrode slit 33B each may be set based on a typical width between pixels such as about 10 micrometers or less, for example, although it is preferable that they be each smaller than the width between the pixels in one embodiment. Also, it is preferable that the width W2 of the inner-electrode slit 33A and the width W3 of the inter-electrode slit 33B each may be smaller than the source line (the signal line) 25 and the gate line (the scanning line) 26 of the pixels as illustrated in FIG. 6 in one embodiment. Further, in one embodiment, the following design example is preferable with respect to each element when taking the human luminosity factor into consideration, where a slit spacing (a slit pitch) W4 is a spacing between the adjacent inner-electrode slits 33A or a spacing between the inner-electrode slit 33A and the inter-electrode slit 33B that are adjacent to each other.

Width W1 of drive electrode 33: about 2 mm to 10 mm (preferably 5 mm to 10 mm)

Width W2 of the inner-electrode slit 33A: 10 micrometers or less

Width W3 of the inter-electrode slit 33B: 10 micrometers or less

Slit spacing (slit pitch) W4: 500 micrometers or less (integral multiple of pixel pitch)

FIG. 15 describes a result of measurement on recognition of the streak-like (slit-like) display defect when the slit pitch of the drive electrode 33 was varied in the touch detection function display unit 44. FIG. 14 describes a measurement environment thereof. The measurement was performed for a typical visual environment of the touch detection function display unit 44, with a surface luminance of 300 cd/m$^2$ and a distance of about 20 centimeters away from the touch detection function display unit 44, for example. Referring to FIG. 15, the streak-like display defect was observed when the slit pitch W4 was 600 micrometers or more. The display defect was hardly observed in a streak-like fashion when the slit pitch W4 was 500 and 400 micrometers, but was observed in the distance of 20 centimeters or less. No streak-like display defect was observed at all when the slit pitch W4 was 300 micrometers or less.

Therefore, it is preferable that the slit pitch W4 be 500 micrometers or less, and more preferably be 300 micrometers or less.

(Operation and Action)

An overall operation of the display device with the touch detection function 40 illustrated in FIGS. 4 and 5 according to the first embodiment will now be described.

The Vcom generating section 41 generates the drive signal Vcom, and supplies the same to the drive electrode driver 43. The drive electrode driver 43 supplies, based on the control signal supplied from the drive control circuit 42, the drive signal Vcom to the plurality of drive electrodes 33 in the touch detection function display unit 44 in a sequential fashion.

Each of the touch detection electrodes 34 of the touch sensor 441 outputs the detection signal Vdet based on the basic principle of the electrostatic capacitance type touch detection described above. The detection signal Vdet may include a waveform having a rising and a falling that are synchronized with a timing of a voltage change in the drive signal Vcom. The multiplexer 47 sequentially switches the sources from which the detection signal Vdet, outputted from each of the touch detection electrodes 34 of the touch sensor 441, is to be obtained so as to obtain the detection signal Vdet therefrom in order, and supplies the same to the detection circuit 48. In the detection circuit 48, the analog LPF section 51 removes a high-frequency component from the detection signal Vdet, and outputs the detection signal Vdet subjected to the high-frequency component removal as a detection signal Vdet2. The A/D converting section 52 converts the detection signal Vdet2 supplied from the analog LPF section 51 into a digital signal. The signal processing section 53 performs, based on the output signal from the A/D converting section 52, a logic operation to detect the presence or absence of the touch performed on the touch sensor 441. The coordinate extracting section 54 detects, based on a result of the touch detection in the signal processing section 53, a touch coordinate on the touch sensor 441. Thus, when a user has touched the touch panel, a position at which the touch has been made by the user is detected.

The source driver 46 supplies the image signal to the liquid crystal display unit 442. The gate driver 45 supplies the liquid crystal display unit 442 with a selection signal (a gate signal) by which a horizontal pixel line subjected to displaying is selected. The liquid crystal display unit 442 performs scanning throughout the entire screen based on those signals and the drive signal Vcom to display an image on the screen. More specifically, with reference to FIG. 6, the image signal supplied through the source line 25 is applied to the pixel electrode 22 of the liquid crystal element LC through the TFT element Tr of the display pixels 20 selected in a line-sequential fashion by the gate line 26, and the drive signal Vcom is applied to the common electrode (the drive electrode 33). Thus, pixel data is written into the liquid crystal element LC, by which displaying of an image is performed.

(Effect)

In the display device with the touch detection function 40 according to the first embodiment of the technology, each of the drive electrodes 33 is provided with the one or more inner-electrode slits 33A, and the inter-electrode slit 33B corresponding to the inner-electrode slit 33A is formed between the two adjacent drive electrodes 33. This makes it possible to reduce a structural difference between a portion where the drive electrode 33 is formed and a portion between the two adjacent drive electrodes 33. Hence, it is possible to uniformize the states of orientation of the liquid crystal molecules in the liquid crystal display unit 442 throughout the entire display region. Also, the width of the drive electrode 33 has the size corresponding to two or more pixel electrodes 22, making it possible to keep down a circuit magnitude and the number of wirings used for the drive electrodes 33. Therefore, it is possible to keep down the circuit magnitude and the number of wirings and to suppress deterioration in display quality while using the plurality of drive electrodes 33.

Second Embodiment

A display device with a touch detection function according to a second embodiment of the technology will now be described. Note that the same or equivalent elements as those of the display device with the touch detection function 40 according to the first embodiment described above are denoted with the same reference numerals, and will not be described in detail.

In the first embodiment described above, the touch detection function display unit 44 has the configuration in which: the liquid crystal display unit 442 including the liquid crystals in any of the various modes such as the TN mode and the ECB mode; and the touch sensor 441 are integrated. The second embodiment has a configuration in which: a liquid crystal display unit including liquid crystals in a transverse electric mode such as an FFS (Fringe Field Switching) mode and an IPS (In-Plane Switching) mode; and a touch sensor are integrated.

In the second embodiment where the liquid crystals in the transverse electric mode are employed, a touch detection function display unit 44B may be configured as illustrated in FIG. 16. FIG. 16 illustrates an example of a cross-sectional configuration of a main part of the touch detection function display unit 44B. Referring to FIG. 16, a liquid crystal layer 6B is sandwiched between a pixel substrate 2B and an opposed substrate 3B. Since names, functions, etc. of other elements are the same as those in the first embodiment described with reference to FIG. 5, those elements will not be described in detail. Unlike the first embodiment of FIG. 5, the drive electrodes 33 in this embodiment, which are shared for both the displaying and the touch detection, are formed immediately above the TFT substrate 21, and structure a part of the pixel substrate 2B. The pixel electrodes 22 are arranged above the drive electrodes 33 with an insulating layer 23 in between. In this embodiment, all of dielectrics, including the liquid crystal layer 6B as well, between the drive electrodes 33 and the touch detection electrodes 34 contribute to the formation of the electrostatic capacitance C1.

A more detailed description is provided with reference to FIGS. 17A and 17B. In a transverse liquid crystal element illustrated in FIGS. 17A and 17B, the drive electrodes (common electrodes) 33, formed on the pixel substrate 2B, are provided thereon with the pixel electrodes 22 via the insulating layer 23. The pixel electrodes 22 may be those patterned like teeth of a comb, and an alignment film 27 is so formed as to cover the pixel electrodes 22. The liquid crystal layer 6B is sandwiched between the alignment film 27 and an alignment film 36 provided on the opposing substrate 3B side. The two polarizing plates 24 and 35 are disposed in crossed nicols. Rubbing directions of the two alignment films 27 and 36 correspond to a direction of a light-transmission axis of one of the two polarizing plates 24 and 35. FIGS. 17A and 17B illustrate an example where the rubbing directions coincide with the light-transmission axis of the polarizing plate 35 on a light-exit side. Further, in this example, the rubbing directions of the two alignment films 27 and 36 and the direction of the light-transmission axis of the polarizing plate 35 are so set as to be almost parallel to an extending direction of the pixel electrodes 22 (a longitudinal direction of the comb teeth) within a range in which a direction of rotation of the liquid crystal molecules is defined.

An operation of the touch detection function display unit 44B having the configuration discussed above will now be described.

Here, description will be given briefly on a principle of a displaying operation in the transverse liquid crystal element with reference to FIGS. 17A to 18B. In FIGS. 17A to 18B, FIGS. 17A and 18A each illustrate a state of the liquid crystal element when no electric field is applied, and FIGS. 17B and 18B each illustrate a state of the liquid crystal element when the electric field is applied.

In the state where a voltage is not applied between the drive electrode 33 and the pixel electrodes 22 (FIGS. 17A and 18A), axes of liquid crystal molecules 61 configuring the liquid crystal layer 6B are orthogonal to the light-transmission axis of the polarizing plate 24 on a light-incidence side, and are parallel to the light-transmission axis of the polarizing plate 35 on the light-exit side. Thus, incident light h, which has transmitted through the polarizing plate 24 on the light-incidence side, reaches the polarizing plate 35 on the light-exit side without causing a phase difference in the liquid crystal layer 6B, and is absorbed by the polarizing plate 35, leading to black displaying. On the other hand, in the state where the voltage is applied between the drive electrode 33 and the pixel electrodes 22 (FIGS. 17B and 18B), orientation directions of the liquid crystal molecules 61 are rotated in an oblique direction with respect to the extending direction of the pixel electrodes 22 by an electric field (transverse electric field) E generated between the pixel electrodes 22. At this time, an intensity of the electric field E in white displaying is so optimized that the liquid crystal molecules 61 located in the center in a thickness direction of the liquid crystal layer 6B are rotated by about 45 degrees. Thus, the incident light h, which has transmitted through the polarizing plate 24 on the light-incidence side, causes therein the phase difference while the incident light h passes through the liquid crystal layer 6B. Hence, the incident light h becomes linearly-polarized light which is rotated at 90 degrees, and the linearly-polarized light passes through the polarizing plate 35 on the light-exit side, leading to the white displaying.

The display device with the touch detection function, utilizing the liquid crystals in the transverse electric mode described above, also achieves effects similar to those according to the first embodiment described above, by allowing the plurality of drive electrodes 33 to have the configuration in which the inner-electrode slit 33A and the inter-electrode slit 33B are provided as in the first embodiment described above.

Third Embodiment

A display device with a touch detection function according to a third embodiment of the technology will now be described. Note that the same or equivalent elements as those of the display devices with the touch detection function according to the first and the second embodiments described above are denoted with the same reference numerals, and will not be described in detail.

The display device with the touch detection function according to the third embodiment utilizes the liquid crystals in the transverse electric mode as in the second embodiment described above, and has a basic configuration which is similar to the configuration of the touch detection function display unit 44B illustrated in FIG. 16. The third embodiment differs from the second embodiment where the drive electrodes 33 has the configuration similar to that of the first embodiment as discussed above, in that a configuration of the inner-electrode slits 33A in the drive electrodes 33 is partially modified.

FIG. 19 illustrates the configuration of the drive electrodes 33 according to the third embodiment. In the above-described first and the second embodiments, the inner-electrode slits 33A are provided continuously to extend in the first direction (the horizontal direction) as illustrated in FIG. 11. In contrast, in this embodiment, the inner-electrode slits 33A are not continuous in the first direction, and discontinuous regions 33C are partially formed to provide slits in an intermittent fashion.

For the purpose of describing an effect obtained by the provision of the discontinuous regions 33C, description will be given in detail on a configuration of the pixel substrate 2B, especially on a wiring layer in the TFT substrate 21, according to the third embodiment with reference to FIGS. 20 and 21.

The pixel substrate 2B has the configuration in which the TFT element Tr as well as the wiring layer thereof, the drive electrode 33, and the pixel electrode 22 are stacked in order on a substrate 71. The substrate 71 can be a glass substrate, for example. In the TFT element Tr and its wiring layer, the source line (image signal line) 25 is formed on the gate line (scanning line) 26 through a gate insulating film 72. The drive electrode 33 is formed on the source line 25 with an insulating layer 73 in between. The pixel electrode 22 and the TFT element Tr are in conduction with one another through a contact hole 74.

As illustrated in FIG. 21, the source line 25 extends in the second direction (the perpendicular direction). FIG. 21 illustrates an exemplary configuration where the pixel electrode 22 has a bent portion 28 and a pixel electrode slit 29. Each of the pixel electrodes 22 illustrated in FIG. 21 may correspond to a sub-pixel.

In the pixel substrate 2B, the plurality of drive electrodes 33 are provided on the opposed substrate 3B side relative to the image signal wirings (the source lines 25). In this embodiment, the inner-electrode slit 33A is discontinuous at an intersection of the inner-electrode slit 33A and the image signal wiring as viewed from the opposed substrate 3B. Also, the inner-electrode slit 33A is so formed that the image signal wiring and an electrode part of the drive electrode 33 overlap one another at the intersection as viewed from the opposed substrate 3B. In other words, in this embodiment, the portion in which the inner-electrode slit 33A and the image signal wiring intersect one another serves as the discontinuous region 33C where the inner-electrode slit 33A is not provided. This allows the image signal wiring to be covered with the electrode part of the drive electrode 33 as viewed from the opposed substrate 3B side. Thus, as illustrated in FIG. 22, a signal noise component from the image signal wiring (the source line 25) is shielded by the drive electrode 33.

FIG. 23 illustrates an electrode configuration according to a comparative example with respect to the third embodiment. In the comparative example, the inner-electrode slits 33A are provided continuously to extend in the horizontal direction. In other words, in the comparative example, the inner-electrode slit 33A is provided also at the position corresponding to the discontinuous region 33C of the drive electrode 33 in the third embodiment. It is likely in the configuration according to the comparative example that the signal noise component from the image signal line (the source line 25) leaks toward the opposed substrate 3B through the inner-electrode slit 33A. The signal noise component may affect the performance in detection when the signal noise component reaches the touch detection electrode 34 provided on the opposed substrate 3B side. In contrast, according to the third embodiment, the inner-electrode slit 33A includes the discontinuous region 33C in the drive electrode 33, making it possible to prevent such an influence on the detection performance from occurring. Also, the provision of the discontinuous region 33C makes it possible to lower a resistance of the drive electrode 33 than the case where the continuous inner-electrode slit 33A is provided.

Application Examples

Application examples of the display devices with the touch detection function according to the embodiments described above will now be described with reference to FIGS. 25 to 29G. Each of the display devices with the touch detection function according to the embodiments is applicable to any electronic unit in any field. The electronic unit may be, for example but not limited to, a television device, a digital camera, a computer including a desk-top personal computer and a laptop personal computer, a portable terminal device including a cellular phone, a video camera, or any other suitable devices. In other words, the display devices with the touch detection function according to the embodiments are applicable to electronic units in all of fields, which display, as an image or a video image, a video signal inputted from the outside or generated internally.

First Application Example

FIG. 25 illustrates an external appearance of a television device to which the display device with the touch detection function according to any one of the embodiments described above is applied. The television device is provided with an image display screen unit 510 including a front panel 511 and a filter glass 512, for example. The image display screen unit 510 includes the display device with the touch detection function according to any one of the embodiments described above.

Second Application Example

FIGS. 26A and 26B each illustrate an external appearance of a digital camera to which the display device with the touch detection function according to any one of the embodiments described above is applied. The digital camera is provided with a light emitting unit 521 for flash, a display unit 522, a menu switch section 523, and a shutter-release button 524, for example. The display unit 522 includes the display device with the touch detection function according to any one of the embodiments described above.

Third Application Example

FIG. 27 illustrates an external appearance of laptop personal computer to which the display device with the touch detection function according to any one of the embodiments described above is applied. The laptop personal computer is provided with a body 531, a keyboard 532 for input-manipulation of characters and the like, and a display unit 533 for displaying an image, for example. The display unit 533 includes the display device with the touch detection function according to any one of the embodiments described above.

Fourth Application Example

FIG. 28 illustrates an external appearance of a video camera to which the display device with the touch detection function according to any one of the embodiments described above is applied. The video camera is provided with a body 541, a lens 542 provided in a front face of the body 541 for picking-up an image of an object, a shooting start/stop switch 543, and a display unit 544, for example. The display unit 544 includes the display device with the touch detection function according to any one of the embodiments described above.

Fifth Application Example

FIGS. 29A to 29G each illustrate an external appearance of a cellular phone to which the display device with the touch detection function according to any one of the embodiments described above is applied. The cellular phone couples an upper casing 710 and a lower casing 720 through a coupling part (or a hinge) 730, and is provided with a display 740, a sub-display 750, a picture light 760, and a camera 770, for example. The display 740 or the sub-display 750 includes the display device with the touch detection function according to any one of the embodiments described above.

The present disclosure contains subject matter related to that disclosed in Japanese Priority Patent Application JP 2010-187175 filed in the Japan Patent Office on Aug. 24, 2010, the entire content of which is hereby incorporated by reference.

Although the technology has been described in terms of exemplary embodiments, it is not limited thereto. It should be appreciated that variations may be made in the described embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. Moreover, no element or component in this disclosure is intended to be dedicated to the public regardless of whether the element or component is explicitly recited in the following claims.

What is claimed is:

1. A display device with a touch detection function, comprising:
   a pixel substrate;
   an opposed substrate disposed to face the pixel substrate;
   a plurality of drive electrodes on the pixel substrate, the drive electrodes extending in a first direction and being arranged side-by-side in a second direction, and each of the drive electrodes being supplied with a drive signal;
   a display section on the pixel substrate, the display section having a plurality of pixel electrodes that are arranged in matrix in the first and second directions to face the drive electrodes, and the display section allowing an image to be displayed by applying the drive signal to each of the drive electrodes and applying an image signal to each of the pixel electrodes;
   a electrode pattern allowing an electrostatic capacitance to be formed between the electrode pattern and the drive electrodes; and,
   an image signal wiring and a drive signal wiring on the pixel substrate, the image signal wiring extending in the second direction and supplying the pixel electrodes with the image signal, and the drive signal wiring supplying the drive electrodes with the drive signal,
   wherein
   each of the drive electrodes has a width in the second direction corresponding to a size of two or more of the pixel electrodes, and has one or more inner-electrode slits extending in the first direction,
   an inter-electrode slit that corresponds to the inner-electrode slit is formed between the drive electrodes adjacent to each other,
   the drive electrodes are disposed nearer to the opposed substrate than the image signal wiring in the pixel substrate,
   the inner-electrode slit is discontinued by non-slit portions of the drive electrode, and
   the non-slit portions are disposed at an intersection, as viewed from the opposed substrate, of the inner-electrode slit and the image signal wiring.

2. The display device according to claim 1, wherein:
each of the drive electrodes has a length in the first direction larger than that of an effective display region in the display section, and
the inner-electrode slit is provided at least in the effective display region.

3. The display device according to claim 1, wherein:
one or both of a first spacing and a second spacing has a size corresponding to a single pixel electrode, the first spacing representing a distance in the second direction between the inner-electrode slits adjacent to each other, and
the second spacing representing a distance in the second direction between the inner-electrode slit and the inter-electrode slit that are adjacent to each other.

4. The display device according to claim 3, wherein the inner-electrode slit and the inter-electrode slit are each provided between the pixel electrodes adjacent to each other.

5. The display device according to claim 4, wherein the display section includes a liquid crystal layer having a mode selected from a group including a twisted-nematic mode, an electrically-controlled birefringence mode, a fringe-field switching mode, and an in-plane switching mode.

6. The display device according to claim 1, wherein
one or both of a first spacing and a second spacing have dimensions of about 500 micrometers or less, the first spacing representing a distance in the second direction between the inner-electrode slits adjacent to each other, and
the second spacing representing a distance in the second direction between the inner-electrode slit and the inter-electrode slit that are adjacent to each other.

7. The display device according to claim 6, wherein one or both of the first spacing and the second spacing have dimensions of about 300 micrometers or less.

8. The display device according to claim 1, wherein the electrode pattern is a plurality of touch detection electrodes that output a detection signal in response to the drive signal applied to the drive electrodes.

9. A display device, comprising:
a pixel substrate;
an opposed substrate disposed to face the pixel substrate;
a display section that is on the pixel substrate and has a plurality of pixel electrodes;
a plurality of drive electrodes on the pixel substrate, the drive electrodes extending in a first direction and being arranged side-by-side in a second direction,
a electrode pattern on the opposed substrate;
an image signal wiring and a drive signal wiring on the pixel substrate, the image signal wiring extending in the second direction and supplying the pixel electrodes with an image signal, and the drive signal wiring supplying the drive electrodes with a drive signal,
wherein
each of the drive electrodes having a width in the second direction corresponding to a size of two or more of the pixel electrodes, and having one or more inner-electrode slits extending in the first direction,
the drive electrodes are disposed nearer to the opposed substrate than the image signal wiring in the pixel substrate,
the inner-electrode slit is discontinued by non-slit portions of the drive electrode, and
the non-slit portions are disposed at an intersection, as viewed from the opposed substrate, of the inner-electrode slit and the image signal wiring.

10. The display device according to claim 9, wherein:
each of the drive electrodes has a length in the first direction larger than that of an effective display region in the display section, and
the inner-electrode slit is provided at least in the effective display region.

11. The display device according to claim 9, wherein a spacing in the second direction between the inner-electrode slits adjacent to each other has a size corresponding to a single pixel electrode.

12. The display device according to claim 9, wherein each of the inner-electrode slits is provided between the pixel electrodes adjacent to each other.

13. The display device according to claim 9, wherein a spacing in the second direction between the inner-electrode slits adjacent to each other has dimensions of about 500 micrometers or less.

14. The display device according to claim 9, wherein a spacing in the second direction between the inner-electrode slits adjacent to each other has dimensions of about 300 micrometers or less.

15. The display device according to claim 9, wherein the electrode pattern is a plurality of touch detection electrodes that output a detection signal in response to the drive signal applied to the drive electrodes.

* * * * *